US006267898B1

(12) United States Patent
Fukuda et al.

(10) Patent No.: US 6,267,898 B1
(45) Date of Patent: Jul. 31, 2001

(54) LEUKAPHERETIC FILTER MEDIUM

(75) Inventors: Tatsuya Fukuda; Jun Tanaka, both of Oita (JP)

(73) Assignee: Asahi Medical Co., Ltd., Tokyo (JP)

( * ) Notice: Subject to any disclaimer, the term of this patent is extended or adjusted under 35 U.S.C. 154(b) by 0 days.

(21) Appl. No.: 09/446,536

(22) PCT Filed: Jun. 26, 1998

(86) PCT No.: PCT/JP98/02871

§ 371 Date: Dec. 27, 1999

§ 102(e) Date: Dec. 27, 1999

(87) PCT Pub. No.: WO99/00172

PCT Pub. Date: Jan. 7, 1999

(30) Foreign Application Priority Data

| Jun. 26, 1997 | (JP) | 9/184590 |
| Jun. 26, 1997 | (JP) | 9/184591 |
| Jun. 26, 1997 | (JP) | 9/184592 |
| Jun. 26, 1997 | (JP) | 9/185924 |
| Jun. 26, 1997 | (JP) | 9/185925 |
| Jun. 26, 1997 | (JP) | 9/185926 |
| Jun. 26, 1997 | (JP) | 9/185927 |

(51) Int. Cl.$^7$ .......................... B01D 37/00; B01D 29/00; B01D 39/00

(52) U.S. Cl. .......................... 210/767; 210/483; 210/488; 210/489; 210/490; 210/491; 210/503; 210/504; 210/505; 210/507; 210/508; 264/172.11; 264/172.13; 264/172.17; 264/DIG. 48; 428/297.4; 435/2

(58) Field of Search ........................ 210/767, 483, 210/488, 489, 490, 491, 503, 504, 505, 507, 508; 264/172.11, 172.17, 172.13, DIG. 48; 435/2; 428/293.4, 295.1, 297.4, 297.7, 298.4

(56) References Cited

U.S. PATENT DOCUMENTS

| 4,246,107 | 1/1981 | Takenaka et al. .................. 210/806 |
| 4,330,410 | 5/1982 | Takenaka et al. .................. 210/767 |

FOREIGN PATENT DOCUMENTS

| 0 155 003 | 9/1985 | (EP) . |
| 47-37648 | 9/1972 | (JP) . |
| 50-5650 | 1/1975 | (JP) . |
| 53-38709 | 4/1978 | (JP) . |
| 58-54125 | 12/1983 | (JP) . |
| 63-264073 | 10/1988 | (JP) . |
| 1-135514 | 5/1989 | (JP) . |
| 1-232972 | 9/1989 | (JP) . |
| 2-77263 | 3/1990 | (JP) . |
| 2-203909 | 8/1990 | (JP) . |
| 7-82160 | 3/1995 | (JP) . |
| WO 93/01880 | 2/1993 | (WO) . |
| WO 97/23266 | 7/1997 | (WO) . |

*Primary Examiner*—John Kim
(74) *Attorney, Agent, or Firm*—Young & Thompson

(57) ABSTRACT

A leukocyte-removing filter medium which comprises a matrix and ultra-fine fibers having a fiber diameter of less than 1.0 μm and not less than 0.01 μm which contains ultra-fine fibers in an amount of less than 50 wt % and not less than 0.1 wt %, the degree of curvature of the ultra-fine fibers being 1.2 or more, and/or the ultra-fine fibers form pores having a roundness of 1.7 or less.

13 Claims, 3 Drawing Sheets

LEUKAPHERETIC FILTER MEDIUM

TECHNICAL FIELD

The present invention relates to a leukocyte-removing filter medium for removing leukocytes from a leukocyte-containing fluid, a process for producing the same, a leukocyte-removing apparatus using the same, and a method for removing leukocytes.

BACKGROUND ART

In the field of blood transfusion, in place of so-called whole blood transfusion comprising transfusing a whole blood product obtained by adding an anti-coagulant to blood collected from a blood donor, so-called component transfusion comprising separating a necessary blood component from the whole blood product and transfusing that blood component to a blood recipient is generally carried out. The component transfusion includes erythrocyte transfusion, platelet transfusion, plasma transfusion, etc., depending on the blood component necessary for a blood recipient. Blood component preparations used in these blood transfusions include red cell products, platelet products, plasma preparations, etc. In recent years, a so-called leukocyte-free blood transfusion has been developed in which a blood product is transfused after being freed of leukocytes contained therein as contaminant. Leukocyte-free blood transfusion was developed after revelation that adverse side effects accompanying blood transfusion, for example, relatively slight adverse side effects such as headache, nausea, chill, non-hemolytic pyretic reaction, etc., and serious adverse side effects such as allo-antigen sensitization, viral infection, post-transfusion GPHD, etc., which have serious influences on a blood recipient, are caused mainly by leukocytes contained as contaminants in a blood product used in transfusion.

To prevent relatively slight adverse side effects such as headache, nausea, chill, pyrexia, etc., it is sufficient that leukocytes in a blood product be removed until the remaining rate becomes less than $10^{-1}$–$10^{-2}$. In addition, it is said that to prevent serious adverse side effects such as alloantigen sensitization, viral infection, etc., it is sufficient that leukocytes be removed until the remaining rate becomes less than $10^{-4}$–$10^{-6}$.

Methods for removing leukocytes from a blood product are divided broadly into two categories, i.e., the centrifugation method in which leukocytes are separated and removed with a centrifuge by utilizing the difference in specific gravity among blood components, and the filter method in which leukocytes are removed by using a filter medium composed of a fibrous material or a porous element such as a porous material having interconnecting voids. The filter method is being generalized at present because it has advantages such as excellent leukocyte-removing capability, easy operations, and low cost. Of the filter method, a method of removing leukocytes by adhesion or adsorption by using non-woven fabric as a filter medium is the most widespread at present because of its especially excellent leukocyte-removing capability.

As to the mechanism of the removal of leukocytes with a filter apparatus using the above-mentioned fibrous material or porous material, removal is caused mainly because leukocytes brought into contact with the filter medium surface are adhered to or adsorbed on the filter medium surface. For example, EP-A-0155003 discloses a technique using non-woven fabric as a filter medium. In addition, WO93/01880 discloses a leukocyte-removing filter medium produced by dispersing, in a dispersion medium, a mass of a large number of small fiber pieces having a fiber diameter of 0.01 μm or less and a length of approximately 1–50 μm, and short fibers which have a fineness of approximately 0.05–0.75 d and an average length of 3–15 mm which can be spun and woven, and then removing the dispersion medium from the resulting dispersion.

Existing leukocyte-removing filters have a leukocyte-removing capability such that the number of remaining leukocytes is $1 \times 10^5$ or less. Under such circumstances, two important requirements have been imposed on leukocyte-removing filters in the market.

The first requirement is to improve the recovery of useful components and improve ease of handling by making unnecessary a procedure for recovering useful components remaining in a filter and a tube because of the presence of physiological saline and air. Improving the recovery of the useful components as compared with the existing leukocyte-removing filters is very worthwhile because blood as a starting material for blood products is often precious blood provided by well-intentioned blood donation, and unrecoverable blood remaining in a leukocyte-removing filter is wasted and discarded as it is together with the filter. It is, however, difficult to greatly improve the recovery of the useful components in a leukocyte-removing filter obtained according to prior art.

The second requirement is to completely prevent serious adverse side effects caused by leukocytes transfused into a patient, by attaining a leukocyte removal rate higher than that of the existing leukocyte-removing filters. However, in the case of a leukocyte-removing filter obtained according to prior art, it is difficult to attain such a high leukocyte removal rate so that adverse side effects can be completely prevented.

In order to satisfy the above requirements set out by the market, the present inventors earnestly investigated and consequently have accomplished the preceding invention (WO97/23266). The preceding invention is explained below in detail. Objects of the preceding invention are to provide leukocyte-removing filter medium which has a much higher leukocyte-removing capability per unit volume than do conventional filter media, and to permit satisfactory flow of a leukocyte-containing fluid; to provide a process for producing the filter medium; and to provide a filter apparatus containing the filter medium, and a method for removing leukocytes from a leukocyte-containing fluid by using the filter apparatus. The filter medium of the preceding invention is a leukocyte-removing filter medium comprising a porous element having pores with an average pore size of less than 100 μm and not less than 1.0 μm, and a fiber structure held thereby and composed of a plurality of fibers having an average fiber diameter of less than 1.0 μm and not less than 0.01 μm, wherein the void content of the filter medium is less than 95% and not less than 50%, the percentage of the fiber structure relative to the filter medium (this percentage is hereinafter referred to as holding amount) is less than 30 wt % and not less than 0.01 wt %. The ratio of the average pore size of pores of the porous element (hereinafter referred to also as the average pore size of the porous element) to the average fiber diameter of the fibers constituting the fiber structure (hereinafter referred to also as the average fiber diameter of the fiber structure) is less than 2000 and not less than 2, and the fiber structure forms a network structure.

In addition, the process for producing the leukocyte-removing filter medium of the preceding invention is, for example, a process of dispersing, in a solvent, fibers with an average fiber diameter of less than 1.0 μm and not less than 0.01 μm obtained by splitting splittable fiber, and making the resulting dispersion into paper together with a porous element having pores with an average pore size of less than 100 μm and not less than 1.0 μm (hereinafter referred to as a porous element having an average pore size of less than 100 μm and not less than 1.0 μm), to hold the fibers in the porous element.

Furthermore, in the preceding invention, a leukocyte-removing filter apparatus was found which contains a leukocyte-removing filter medium properly located therein which comprises a porous element having an average pore size of less than 100 μm and not less than 1.0 μm and a fiber structure composed of a plurality of fibers with an average fiber diameter of less than 1.0 μm and not less than 0.01 μm (hereinafter referred to as a fiber structure having an average fiber diameter of less than 1.0 μm and not less than 0.01 μm). The fiber structure is held by the porous element, wherein the void content of the filter medium is less than 95% and not less than 50%. The holding amount of the fiber structure relative to the filter medium is less than 30 wt % and not less than 0.01 wt %, the ratio of the average pore size of the porous element to the average fiber diameter of the fiber structure is less than 2000 and not less than 2, and the fiber structure forms a network structure. A method for removing leukocytes from a leukocyte-containing fluid by filtering the leukocyte-containing fluid by using the apparatus above was also found.

A typical filter medium of the preceding invention is shown in FIG. 1A and FIG. 1B.

FIG. 1A is an electron micrograph of the surface of the filter medium having a curvilinear network structure of the preceding invention.

FIG. 1B is an electron micrograph of a section of the filter medium shown in FIG. 1A.

The term "average fiber diameter" in the preceding invention means a value obtained by taking a scanning electron micrograph of the fibers constituting the fiber structure, measuring the diameters of 100 or more fibers randomly selected therefrom, and calculating the number average of these diameters. The average fiber diameter may be measured either before holding the fibers in the porous element used as a matrix, or after holding the fibers in the porous element used as a matrix. Particularly, when the porous element is composed of an assembly of fibers, the average fiber diameter is preferably measured before holding the fibers in the porous element because the measurement can be more accurately carried out.

Fibers having an average fiber diameter of less than 0.01 μm are not suitable because they are so poor in strength that they tend to be cut by leukocytes or other hemocyte components which collide with the fibers during the treatment of a leukocyte-containing fluid. Fibers having an average fiber diameter of 1.0 μm or more are not suitable because the porosity of the filter medium is decreased, resulting in an unsatisfactory flow of a leukocyte-containing fluid. For capturing, for example, poorly adherent lymphocytes having a relatively small diameter among leukocytes by efficiently bringing them into contact with the filter medium at many points, the average fiber diameter of the fibers is preferably less than 0.8 μm and not less than 0.01 μm.

In the fiber structure according to the preceding invention, fibers having a very small average fiber diameter form a network structure. Such a reticulate fiber structure is held by the porous element. In the preceding invention, the passage "the fiber structure is held by the porous element" means that as shown in FIG. 1A, the above-mentioned reticulate fiber structure is fixed in the matrix so that they may cover the pore portions of the porous element used as matrix. FIG. 1A shows an electron micrograph of the filter medium having a typical network structure of the preceding invention. Physical and structural characteristics of the filter medium of the preceding invention are described below with reference to FIG. 1A.

In the filter medium of the preceding invention, a plurality of fibers having an average fiber diameter of less than 1.0 μm and not less than 0.01 μm constitute the fiber structure by forming a network structure, and the fiber structure is held by the porous element having pores with an average pore size of less than 100 μm and not less than 1.0 μm. The fibers constituting the fiber structure, however, are not in the form of a bundle but are so-called single fibers, each of which is in a split state. A plurality of such single fibers are physically entangled with one another to form the network structure. As the network structure according to the preceding invention, a structure is exemplified in which, as represented by the network structure shown in FIG. 1A, fibers constituting the fiber structure have a curved structure, so that meshes formed by them are curvilinear.

The reticulate fiber structure is preferably uniformly held by the porous element in a section perpendicular to the flow of a leukocyte-containing fluid because leukocytes can be efficiently captured. The uniform holding of the fiber structure by the porous element in a section perpendicular to the flow of a leukocyte-containing fluid means that the introducing amount (density) of the fiber structure is substantially the same in various portions of the filter medium which are randomly sampled in the section perpendicular to the flow of the leukocyte-containing fluid. In practice, this introducing amount can be determined by measuring the variation of the amount of the fiber structure present in a definite amount of the filter medium in the sampled portions of the filter medium.

The following is especially preferable: the introducing amount of the fiber structure is substantially the same in various portions of the filter medium which are randomly sampled in a section perpendicular to the flow of a leukocyte-containing fluid, and moreover, the mesh size distribution is substantially the same in the various portions, so that substantially the same reticulate structures are formed therein. Such a state is expressed by the passage "a uniform network structure is formed" in the preceding specification. More specifically, the passage "a uniform network structure is formed" means a state at which, when observed by an electron microscope, the network structures in the randomly sampled portions of the filter medium are similar in mesh size distribution and mesh shape, and are regarded as substantially the same. A state at which no uniform network structure has been formed means a state at which when the network structures in the randomly sampled portions of the filter medium are observed, it is possible to judge that the mesh size distribution is widely different in these portions and that the shape of mesh is also clearly different in these portions.

In the filter medium of the preceding invention, the following are preferable: a fiber structure having an average fiber diameter of less than 1.0 μm and not less than 0.01 μm which forms a network structure and is held by a porous element having an average pore size of less than 100 μm and not less than 1.0 μm, the void content of the filter medium is less than 95% and not less than 50%, and the ratio of the average pore size of the porous element to the average fiber diameter of the fiber structure is less than 2000 and not less than 2.

Here, the average pore size is a value obtained by measurement using a mercury injection method. That is, when the amount of mercury injected is taken as 0% at a mercury injection pressure of 1 psia and as 100% at a mercury injection pressure of 2650 psia, a pore size corresponding to an amount of mercury injected of 50% was taken as the average pore size. An average pore size of less than 1.0 μm is not suitable because a leukocyte-containing fluid does not flow, and an average pore size of 100 μm or more is not suitable because maintenance of the fiber structure often becomes difficult.

For keeping good flow of a leukocyte-containing fluid, the ratio of the average pore size of the porous element to the average fiber diameter of the fiber structure is preferably less than 2000 and not less than 2. A ratio of the average pore size of the porous element to the average fiber diameter of the fiber structure of less than 2 is not suitable because there is almost no difference between the pore size of the porous element and the diameter of fibers constituting the fiber structure, so that the pores of the porous element are blocked with the fibers, resulting in an extremely bad flow of a leukocyte-containing fluid. A ratio of the average pore size of the porous element to the average fiber diameter of the fiber structure of 2000 or more is not suitable because the pore size of the porous element is so large that it becomes difficult to hold the fiber structure in the porous element so that the fiber structure may cover the pores of the porous element, and therefore the leukocyte-removing capability is extremely deteriorated and, moreover, the entanglement of the fiber structure and the porous element with each other becomes insufficient, so that the fiber structure tends to be released. The ratio of the average pore size of the porous element to the average fiber diameter of the fiber structure is more preferably less than 1,800 and not less than 10.

The porous element according to the preceding invention includes fiber assemblies, porous membranes, spongy and connectedly porous materials, etc., which have an average pore size of less than 100 μm and not less than 1 μm. As the porous element, fiber assemblies composed of long fibers are preferable. Preferable examples of the form of the fiber assemblies are non-woven fabric, woven fabric, and knitted fabric. Non-woven fabric is especially preferable. When the porous element is a fiber assembly, the ratio of the average fiber diameter of the fiber assembly to the average fiber diameter of the fiber structure is particularly preferable to be less than 1,000 and not less than 10 for keeping good flow of a leukocyte-containing fluid. As a material for the porous element, any material capable of forming a non-woven fabric, woven fabric, knitted fabric, porous membrane, spongy and connectedly porous material or the like, such as polyurethanes, polyesters, polyolefins, polyamides, polystyrenes, polyacrylonitriles, cellulose, cellulose acetate, etc. can be used.

Furthermore, in the leukocyte-removing filter medium of the preceding invention, the holding amount of the fiber structure relative to the filter medium is preferably less than 30 wt % and not less than 0.01 wt %. A holding amount of less than 0.01 wt % is not suitable because a fiber content sufficient to capture leukocytes in a leukocyte-containing fluid cannot be attained. A holding amount of 30 wt % or more is not suitable because the content of fibers introduced into the porous element is too high, and the pore portions of the porous element are blocked, so that a leukocyte-containing fluid does not flow. The holding amount of the fiber structure relative to the filter medium is more preferably less than 10 wt % and not less than 0.03 wt %.

The holding amount can be measured on the basis of the difference of the weight before and after holding the fiber structure in the porous element. When the holding amount of the fiber structure is as small as about 3 wt % per unit weight of the filter medium, a method comprising dissolving only the fiber structure, extracting its component, and determining the amount of the extracted component can be employed for determining the holding amount of the fiber structure with a precision higher than that of the weight measurement. This quantitation method is concretely explained below by taking the case where the fiber structure is made of cellulose. The filter medium is immersed in a solution containing cellulase dissolved therein, and is shaken to decompose the cellulose of the fiber structure into glucose, which is extracted. The extracted glucose is quantitated by using a commercially available glucose-quantitating reagent, and, the amount of the fiber structure held by the porous element is calculated from the amount of glucose quantitated.

For attaining a high leukocyte-removing capability, the fiber structure is preferably held by the whole porous element. The fiber structure, however, may be supported on one surface of the porous element if it is difficult to hold the fiber structure in the porous element so that the fiber structure may be present also in the innermost of the porous element, owing to a restriction by a production process. In such a case, as a means for easily improving the leukocyte-removing capability of the filter medium by increasing the holding amount of the fiber structure, it is also possible to support the fiber structure on each of the two surfaces of the porous element. In both cases, substantially supporting the fiber structure uniformly on the porous element is preferable for attaining a high leukocyte-removing capability.

In the leukocyte-removing filter medium of the preceding invention, the void content is preferably less than 95% and not less than 50%. A void content of the filter medium of less than 50% is not suitable because the flow of a leukocyte-containing fluid is not good. A void content of 95% or more is not suitable because the mechanical strength of the filter medium is so low that the filter medium is crushed during the treatment of a leukocyte-containing fluid, and no longer fulfils its function as a filter medium.

The void content is measured by measuring the dry weight ($W_1$) of a piece with a predetermined area obtained by cutting the filter medium, and measuring also the thickness of the piece, followed by calculation of the volume (V) of the piece. The piece of the filter medium is immersed in pure water and deaerated, after which the weight ($W_2$) of the water-containing piece of the filter medium is measured. From these values, the void content is calculated by the following equation. In the following equation, ρ is the density of pure water.

$$\text{Void content }(\%) = (W_2 - W_1) \times \rho \times 100 / V$$

The thickness of the leukocyte-removing filter medium of the preceding invention is preferably less than 30 mm and not less than 0.1 mm in the direction of flow of a leukocyte-containing fluid. A thickness of less than 0.1 mm is not desirable because the frequency of collision between leukocytes in the leukocyte-containing fluid and the filter medium is decreased, so that it is difficult to attain a high leukocyte-removing capability. A thickness of 30 mm or more is not desirable, for example, because the resistance to passage of the leukocyte-containing fluid is increased, resulting in elongation of the treatment time and hemolysis accompanying the breakage of erythrocyte membranes. The thickness of the filter medium in the direction of flow is more preferably less than 15 mm and not less than 0.1 mm.

When adopting a production process to obtain the filter medium of the preceding invention wherein the process is characterized by dispersing fibers with an average fiber diameter of less than 1.0 μm and not less than 0.01 μm in a solvent, and then making the resulting dispersion into paper together with a porous element with an average pore size of less than 100 μm and not less than 1.0 μm to hold the fibers in the porous element, the ratio of the average pore size of the porous element to the average fiber diameter of the fiber structure is more preferably less than 300 and not less than 16. In addition, the holding amount of the fiber structure relative to the filter medium is preferably less than 5.0 wt % and not less than 0.3 wt %. In addition, the average fiber diameter of the fiber structure is more preferably less than 0.5 μm and not less than 0.05 μm.

When the leukocyte-removing filter medium of the preceding invention is treated with a binder such as a water-insoluble polymer solution in post-processing, the network structure is generally liable to be destroyed. For example, fibers constituting the fiber structure are bound into a bundle, or a film-like substance is formed among a plurality of the fibers. Therefore, it is preferable to avoid treatment with such a binder. On the other hand, when the fibers are relatively thick and short and are not sufficiently physically entangled with the porous element, treating the filter medium with a binder such as a relatively dilute water-insoluble polymer solution in post-processing is preferable because it permits effective fixation of the fibers in the porous element and prevention of the release of the fibers.

The following, for example, is also possible: the surface of the leukocyte-removing filter medium of the preceding invention is modified into a surface to which platelets or erythrocytes hardly adhere, whereby the recovery of platelets or erythrocytes is improved and only leukocytes are removed. As a method for modifying the surface of the filter medium, there are mentioned surface graft polymerization, coating with a polymeric material, electron discharge machining, etc.

As a polymeric material used for modifying the surface of the filter medium by the surface graft polymerization or the coating with a polymeric material, polymeric materials having one or more nonionic hydrophilic groups are preferable. The nonionic hydrophilic groups include hydroxyl group, amide group, poly-(ethylene oxide) chains, etc. Monomers usable for synthesizing the polymeric material having one or more nonionic hydrophilic groups include, for example, 2-hydroxyethyl methacrylate, 2-hydroxyethyl acrylate, vinyl alcohol (prepared by hydrolyzing a polymer obtained by polymerizing vinyl acetate), methacrylamide and N-vinylpyrrolidone. Of the monomers mentioned above, 2-hydroxyethyl methacrylate and 2-hydroxyethyl acrylate are preferable from the viewpoint of easy availability, ease of handling in polymerization, treating capability for a leukocyte-containing fluid, etc.

The polymeric material used for the above-mentioned surface graft polymerization or coating with the polymeric material is preferably a copolymer containing 0.1 to 20 mole % of monomer units derived from a polymerizable monomer having one or more nonionic hydrophilic groups and/or basic nitrogen-containing functional groups. The basic nitrogen-containing functional groups include primary amino group, secondary amino group, tertiary amino group, quaternary amino group, and nitrogen-containing aromatic ring groups such as pyridyl group, imidazole group, etc. The polymerizable monomer having one or more basic nitrogen-containing functional groups includes methacrylic acid derivatives such as dimethylaminoethyl methacrylate, diethylaminoethyl methacrylate, dimethylaminopropyl methacrylate, 3-dimethylamino-2-hydroxypropyl methacrylate, etc.; allylamine; vinyl derivatives of nitrogen-containing aromatic compounds, such as p-vinylpyridine, 4-vinylimidazole, etc.; and quaternary ammonium salts obtained by reacting the above-exemplified vinyl compound with an alkyl halide. Of the polymerizable monomers mentioned above, dimethylaminoethyl methacrylate and diethylaminoethyl methacrylate are preferable from the viewpoint of easy availability, ease of handling in polymerization, treating capability for a leukocyte-containing fluid, etc.

When the content of monomer units derived from the polymerizable monomer having one or more basic nitrogen-containing functional groups in the copolymer obtained is less than 0.1%, no sufficient inhibitory effect on the adhesion of platelets to the surface of the filter medium is undesirably obtained. When the content of monomer units derived from the polymerizable monomer having one or more basic nitrogen-containing functional groups in the copolymer is more than 20%, not only leukocytes but also useful components such as platelets and erythrocytes are undesirably apt to adhere to the surface of the filter medium. The content of monomer units derived from the polymerizable monomer having one or more basic nitrogen-containing functional groups in the copolymer is more preferably 0.2 to 5%.

In the preceding invention, as a result of earnest investigations for providing a process for producing a leukocyte-removing filter medium, it was found that by dispersing fibers with an average fiber diameter of less than 1.0 μm and not less than 0.01 μm in a dispersion medium and making the resulting dispersion into paper together with a porous element having an average pore size of less than 100 μm and not less than 1.0 μm to hold the fibers in the porous element, a leukocyte-removing filter medium can be produced which comprises the porous element and a fiber structure composed of a plurality of the fibers, wherein the void content of the filter medium is less than 95% and not less than 50%, the holding amount of the fiber structure relative to the filter medium is less than 30 wt % and not less than 0.01 wt %, the ratio of the average pore size of the porous element to the average fiber diameter of the fiber structure is less than 2000 and not less than 2, and wherein the fiber structure forms a network structure.

For the formation of the network structure by the fiber structure in the filter medium of the preceding invention, the fibers having an average fiber diameter of less than 1.0 μm and not less than 0.01 μm should have, for example, the following properties: they have a curved shape, are per se flexible and easy to curve, and are relatively short. Fibers having no curved shape in themselves are also suitable after being curved by heat treatment, mechanical treatment or treatment with any of various chemicals.

The above-mentioned fibers having an average fiber diameter of less than 1.0 μm and not less than 0.01 μm can be produced, for example, by subjecting the following fiber to physical stirring with a mixer or the like, treatment with a high-pressure liquid jet, treatment using a high-pressure homogenizer, or the like: splittable fiber represented by regenerated cellulose fiber or microporous splittable acrylic fiber, or splittable conjugate fiber obtained by any of the well-known methods disclosed in JP-B-47-37648, JP-A-50-5650, JP-A-53-38709, etc.

As a material for the fiber which is easy to curve, cellulose, polyacrylonitriles, polyesters, polyolefins, polyamides, etc. are suitable, though there can be used any material so long as when it is processed into fiber having an average fiber diameter of less than 1.0 μm and not less than 0.01 μm, the fiber can be curved by heat treatment or mechanical treatment.

A process for obtaining the fibers having the above-mentioned specific average fiber diameter by subjecting regenerated cellulose fiber among the splittable fibers mentioned above to acid treatment or alkali treatment if necessary, and then physically stirring the thus treated fiber by the use of a mixer or the like to fibrillate the same, is especially preferable because fibers having a very small fiber diameter and a curved shape can easily be obtained to easily form a network structure. This process for obtaining the fibers having an average fiber diameter of less than 1.0 µm and not less than 0.01 µm by fibrillating regenerated cellulose fiber is concretely explained below in further detail. First, commercially available regenerated cellulose fiber having a fiber diameter of about 10 µm is cut to a predetermined length, immersed in an about 3 wt % aqueous sulfuric acid solution, and subjected to acid treatment therein with mild stirring at 70° C. for 30 minutes. When the regenerated cellulose fiber subjected to the acid treatment is washed with water, and then vigorously stirred in water with a mixer at 10,000 rpm for 30 to 90 minutes, the regenerated cellulose fiber is fibrillated to be decreased in diameter, and the desired fibers can be finally obtained.

Fibers with an average fiber diameter of less than 1.0 µm and not less than 0.01 µm obtained by using well-known archipelago-type fiber as a starting material can also have a curved shape and are suitable for producing the above-mentioned leukocyte-removing filter medium. These fibers are produced by forming the starting fiber into a curved shape by previous heat treatment or mechanical treatment if necessary, and then dissolving away the sea component by the use of any of various solvents.

The thus obtained fibers having an average fiber diameter of less than 1.0 µm and not less than 0.01 µm are dispersed in a dispersion medium to a concentration of about 0.01 g/L to about 1 g/L to obtain a fiber dispersion. Pure water, aqueous solutions containing 0.1%–5% of a surfactant, and aqueous solutions which have been increased in viscosity by the addition of approximately 0.1%–5% of a polyacrylamide in order to further improve the dispersibility of the fibers have been used as the dispersion medium.

Next, the bottom of a funnel-shaped vessel is covered with a porous element having an average pore size of less than 100 µm and not less than 1.0 µm, and the aforesaid fiber dispersion is poured into the vessel and once accumulated, water is discharged at a stretch, and then the porous element is dried, whereby the filter medium can be obtained. In this case, the fibers are preferably short because they can be held in the porous element so that they may be present also in the innermost part of the porous element.

Treating the filter medium produced by the above production process with a high-pressure liquid jet at about 3 kg/cm$^2$ to 200 kg/cm$^2$ is preferable because the treatment makes it possible to hold the fibers in the porous element more uniformly so that they may be present also in the innermost part in the direction of thickness of the porous element.

The next object of the preceding invention is to provide a leukocyte-removing filter apparatus which removes leukocytes from a leukocyte-containing fluid while minimizing loss of useful blood components, and which can attain a high leukocyte removal rate, and a method for removing leukocytes using the apparatus; and to provide a leukocyte-removing filter apparatus which can attain a leukocyte removal rate much higher than that of conventional leukocyte-removing filter apparatuses, and a method for removing leukocytes using this apparatus. The present inventors earnestly investigated and consequently found that the above object can be achieved by filtering a leukocyte-containing fluid by the use of a filter apparatus obtained by properly locating the filter medium of the preceding invention in a container at least having an inlet and an outlet.

The leukocyte-removing filter apparatus of the preceding invention is an apparatus obtained by properly locating a filter comprising the filter medium of the preceding invention in a container at least having an inlet and an outlet. Either a sheet or a laminate of two or more sheets of the filter medium may be packed in the container in the direction of flow of a leukocyte-containing fluid. On the other hand, for example, when a solution containing a polymeric material is poured over the filter medium to carry out coating treatment for the purpose of modifying the surface of the filter medium, the lowest sheet of the filter medium in the apparatus of the preceding invention adheres to the inner surface of the container to cause a one-sided flow of a leukocyte-containing fluid in some cases. In such a case, the one-sided flow of the leukocyte-containing fluid caused by the adhesion of the filter medium to the inner surface of the container can be prevented by inserting a relatively coarse filter medium as the lowest layer.

The leukocyte-removing filter apparatus of the preceding invention may further contain other filter media upstream and/or downstream to the filter medium of the preceding invention.

In general, a leukocyte-containing fluid often contains very small aggregates. It is also possible to use a prefilter in order to remove leukocytes from such a leukocyte-containing fluid containing very small aggregates. As the prefilter, there are preferably used, for example, an assembly of fibers having an average fiber diameter of 8 µm to 50 µm and a connectedly porous material having pores with an average pore size of 20 µm to 200 µm.

In the preceding invention, the filter medium of the leukocyte-removing filter apparatus preferably has a sectional area in a direction normal to the direction of flow of a leukocyte-containing fluid of less than 100 cm$^2$ and not less than 3 cm$^2$. When the sectional area is less than 3 cm$^2$, the flow of the leukocyte-containing fluid is extremely restricted, and therefore such a small sectional area, is not desirable. When the sectional area is 100 cm$^2$ or more, the filter would be thinned unavoidably, so that high leukocyte-removing capability can not be attained when the filter apparatus is increased in size. Therefore, such a large sectional area also is not desirable.

The method for removing leukocytes of the preceding invention comprises treating a leukocyte-containing fluid by the use of the leukocyte-removing filter apparatus of the preceding invention, and recovering the filtrate. In detail, it is a method for removing leukocytes from a leukocyte-containing fluid which comprises using an apparatus comprising 1) an inlet, 2) a filter comprising the filter medium of the preceding invention, and 3) an outlet, introducing the leukocyte-containing fluid through the inlet, and recovering the filtrate obtained by filtration through the filter medium, through the outlet.

The leukocyte-containing fluid to be filtered by the use of the leukocyte-removing filter apparatus of the preceding invention includes, for example, whole blood products, concentrated red cell products and platelet concentrates, as well as body fluids.

When the leukocyte-containing fluid is a whole blood product or a concentrated red cell product, the leukocyte-containing fluid is preferably treated by the use of a leukocyte-removing filter apparatus having an apparatus capacity per unit of less than 20 mL and not less than 3 mL.

The term "unit" used here means approximately 300 mL–550 mL of the whole-blood product or the concentrated red cell product. When the apparatus capacity per unit is less than 3 mL, there is a strong, undesirable possibility that high leukocyte removal rate can not be attained. When the apparatus capacity per unit is 20 mL or more, the amount of unrecoverable useful components in the leukocyte-containing fluid which remain inside the apparatus is undesirably increased. By filtering a whole blood product or a concentrated red cell product by the use of the leukocyte-removing filter apparatus of the preceding invention, leukocytes can be removed to such an extent that the number of remaining leukocytes in the recovered fluid is less than $1\times10^3$/unit.

When the leukocyte-containing fluid is a platelet concentrate, the leukocyte-containing fluid is preferably treated by the use of a leukocyte-removing filter apparatus having an apparatus capacity per 5 units of less than 10 mL and not less than 1 mL. The term "5 units" used here means about 170 mL to about 200 mL of the concentrated platelet preparation. When the apparatus capacity per 5 units is less than 1 mL, there is undesirably a strong possibility that high leukocyte removal rate can not be attained. When the apparatus capacity per 5 units is 10 mL or more, the amount of unrecoverable useful components remaining inside the apparatus is undesirably increased. By filtering a platelet concentrate by the use of the leukocyte-removing filter apparatus of the preceding invention, leukocytes can be removed to such an extent that the number of remaining leukocytes in the recovered fluid is less than $1\times10^3$/5 units.

When leukocytes are removed simultaneously with blood transfusion at a bedside in a hospital by using the leukocyte-removing filter apparatus of the preceding invention, a leukocyte-containing fluid is preferably filtered at a rate of less than 20 g/min. and not less than 1 g/min. On the other hand, when leukocytes are removed from a blood product for transfusion in a Blood Center by the use of the leukocyte-removing filter apparatus of the preceding invention, a leukocyte-containing fluid is preferably filtered at a rate of less than 100 g/min. and not less than 20 g/min.

The leukocyte-removing filter apparatus of the preceding invention can be used not only for removing leukocytes responsible for various adverse side effects after blood transfusion using a blood product for transfusion, but also for removing leukocytes in an extracorporeal circulation therapy for autoimmune diseases. The extracorporeal circulation therapy for autoimmune diseases comprises filtering the leukocyte-containing body fluid of a patient continuously by the use of the leukocyte-removing filter apparatus of the preceding invention, returning the recovered fluid into the body, and thereby removing leukocytes from the body fluid.

DISCLOSURE OF THE INVENTION

The present inventors earnestly investigated further development of the techniques disclosed in the preceding invention, and have accomplished the present invention.

A first object of the present invention is to provide a leukocyte-removing filter medium which has a marked leukocyte-removing capability per unit volume, permits a satisfactory flow of a leukocyte-containing fluid, has little undesirable influence on hemocytes such as erythrocytes and platelets, and has excellent hemocompatibility. The filter medium is a leukocyte-removing filter medium which comprises a matrix and ultra-fine fibers having a fiber diameter of less than 1.0 μm and not less than 0.01 μm and contains the ultra-fine fibers in an amount of less than 50 wt % and not less than 0.1 wt %. The degree of curvature of the ultra-fine fibers is 1.2 or more, and/or the ultra-fine fibers form pores having a roundness of 1.7 or less (this filter medium is hereinafter referred to as the first filter medium of the present invention). Alternatively, the present invention is a leukocyte-removing filter medium which comprises a matrix and ultra-fine fibers, i.e., fibril fibers having a fiber diameter of less than 1.0 μm and not less than 0.01 μm, and which contains the ultra-fine fibers in an amount of less than 50 wt % and not less than 0.1 wt % (this filter medium is hereinafter referred to as the second filter medium of the present invention). Alternatively, the present invention is a leukocyte-removing filter medium comprising non-woven fabric of splittable cellulose containing ultra-fine fibers, i.e., cellulose microfibrils having a fiber diameter of less than 1.0 μm and not less than 0.01 μm (this filter medium is hereinafter referred to as the third filter medium of the present invention). The present inventors found that the above first object can be achieved by using any of these leukocyte-removing filter media.

A second object of the present invention is to provide a process for producing the leukocyte-removing filter medium of the present invention. This process includes, for example, a process of first dispersing and mixing a matrix material and ultra-fine fibers having a fiber diameter of less than 1.0 μm and not less than 0.01 μm, in a dispersion medium, and then making the resulting dispersion into paper to produce the filter medium. The present inventors found that the leukocyte-removing filter medium of the present invention can be very effectively produced by such a process.

A third object of the present invention is to provide a leukocyte-removing filter apparatus and a method for removing leukocytes which make it possible to remove leukocytes from a leukocyte-containing fluid such as a whole blood product, red cell product, platelet product or the like, while minimizing loss of useful blood components and attaining a high leukocyte removal rate. The present inventors found that by filtering a leukocyte-containing fluid by the use of a leukocyte-removing filter apparatus containing the leukocyte-removing filter medium of the present invention, the loss of useful components can be reduced and, moreover, a high leukocyte removal rate can be attained.

BEST MODE FOR CARRYING OUT THE INVENTION

Figure 1A:
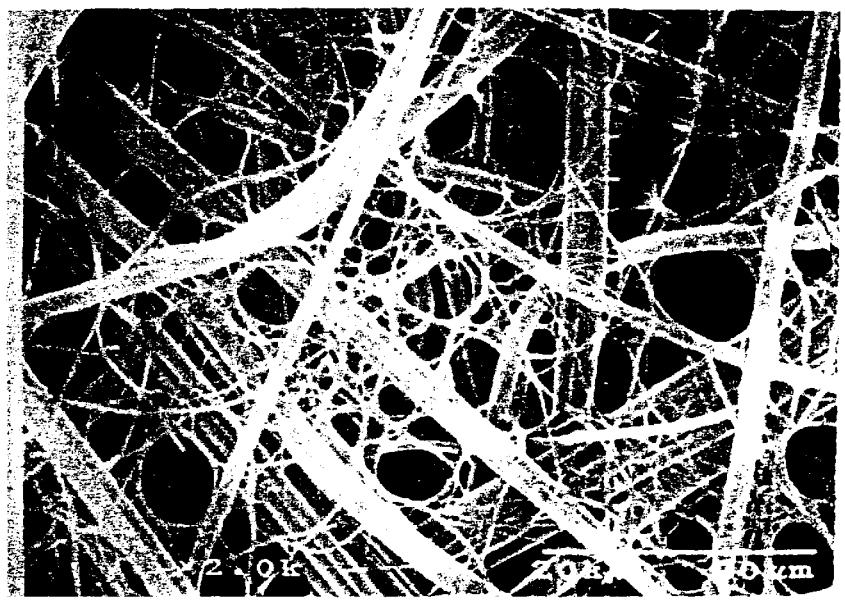
FIG. 1A is an electron micrograph of the surface of the filter medium having a typical network structure of the preceding invention.

The term "fiber diameter of ultra-fine fibers" in the present invention means a value obtained by the method adopted in the preceding invention or by the following procedure. Portions which are individually considered to be substantially uniform are sampled from ultra-fine fibers which constitute a leukocyte-removing filter medium or from the leukocyte-removing filter medium itself, and photographed by using a scanning electron microscope and the like. In the sampling from the filter medium, the effective filtration sectional area portion of the filter medium is partitioned into sections about 0.5 cm square, and of these sections, six sections are sampled at random. The random sampling is carried out, for example, by assigning a lot number to each of the above-mentioned sections and selecting necessary sections by, for instance, a method using a table of random numbers. Three or more, preferably five or more portions of each sampled section are photographed at an enlargement ratio of 2000 or more. A checkered transparent sheet having lines drawn thereon lengthwise and widthwise at regular intervals of approximately 0.1 mm–10 mm is placed on each photograph, and for a fiber at an intersection of vertical and horizontal lines, i.e., a lattice point, the fiber width perpendicular to the fiber axis is measured as the fiber diameter.

The ultra-fine fibers used in the filter medium of the present invention refer to fibers having a fiber diameter of less than 1.0 $\mu$m and not less than 0.01 $\mu$m. When the fiber diameter is less than 0.01 $\mu$m, the fibers are not sufficient in strength and tend to be cut by leukocytes or other hemocyte components, which collide with the fibers during the treatment of a leukocyte-containing fluid. When the fiber diameter is 1.0 $\mu$m or more, the surface area per unit volume of the filter medium is decreased, so that the leukocyte-removing capability per unit volume cannot be enhanced. The fiber diameter is preferably less than 0.8 $\mu$m and not less than 0.02 $\mu$m, and more preferably less than 0.6 $\mu$m and not less than 0.1 $\mu$m. The average fiber diameter is preferably less than 0.7 $\mu$m and not less than 0.05 $\mu$m, and more preferably less than 0.5 $\mu$m and not less than 0.1 $\mu$m.

The term "degree of curvature" in the present invention means a value obtained by the following procedure. When the fiber diameter of a fiber at a lattice point is less than 1.0 $\mu$m and not less than 0.01 $\mu$m (the ultra-fine fiber according to the present invention), the fiber at the lattice point is used as a sample for measuring the degree of curvature. In a photograph taken for determining the degree of curvature, both ends of the fiber used as a sample for the measurement are chosen as starting points. However, for example, when the ultra-fine fiber used as a sample for the measurement is intertwined with another fiber and hence cannot be traced, or when this ultra-fine fiber cannot be wholly seen because a material matrix such as a thick fiber obstructs the view of the ultra-fine fiber, a point from which the ultra-fine fiber is intertwined with the other fiber or gets behind the matrix material is chosen as a starting point. When the fiber diameter of the fiber at the lattice point decreases to less than 0.01 $\mu$m or increases to 1.0 $\mu$m or more in any portion between the ends of the fiber, even though it is less than 1.0 $\mu$m and not less than 0.01 $\mu$m in the other portion, a point from which the fiber diameter decreases to less than 0.01 $\mu$m or increases to 1.0 $\mu$m or more is chosen as a starting point. In addition, when a matrix material such as fiber having a large fiber diameter is present and the ultra-fine fiber adheres to the matrix material, a point from which the ultra-fine fiber adheres to the matrix material is chosen as a starting point.

The actual length of the fiber between the starting points thus chosen in the photograph is measured with an apparatus such as an image analyzer and suitable instruments and taken as $L_1$. Next, the distance between the starting points in the case of joining them by a straight line is taken as $L_2$, and $L_1$ is divided by $L_2$. Such a measurement is carried out for 100 or more ultra-fine fibers. The degree of curvature is defined as a value obtained by dividing the sum of quotients obtained by the division of $L_1$ by $L_2$ by the number of fibers subjected to the measurement. The term "degree of curvature" in the present invention is an indication of the non-straightness of a fiber, and means that a fiber having a high value of this indication has a high degree of inflection such as bending or meandering between the ends of the fiber.

The degree of curvature of the ultra-fine fibers used in the first leukocyte-removing filter medium of the present invention is 1.2 or more. Fibers having such a high linearity that their degree of curvature is less than 1.2 are not suitable for the following reasons: when a plurality of ultra-fine fibers are intertwined with one another, they tend to become a bundle like a fiber having a large fiber diameter; and when, for example, fiber having a large fiber diameter is present as a matrix material, ultra-fine fibers adhere to the thick fiber along the fiber axis of the thick fiber, so that the actual surface area which contributes to the removal of leukocytes is not sufficient, resulting in difficult enhancement of the leukocyte-removing capability per unit volume. The degree of curvature is preferably less than 10 and not less than 1.2, more preferably less than 5.0 and not less than 1.4, most preferably less than 3.0 and not less than 1.7.

Fibers having a curved shape have also been described as a preferable example in the case of the preceding invention, but the relation of the curvature of fibers to the leukocyte-removing capability of a filter medium and the flowability of blood has not been investigated in detail. In the case of the present invention, the enormous importance of using ultra-fine fibers having a degree of curvature of 1.2 or more was found by investigating the leukocyte-removing capability of a filter medium and the flowability of blood in further detail by using an indication having numerical quantitativeness, i.e., the degree of curvature. The reason for this importance can be postulated as follows. Because of their high degree of curvature, the ultra-fine fibers hardly come into contact with one another along their fiber axes even if they are intertwined with one another, and hence the substantial fiber diameter is hardly increased. Moreover, even if fiber having a large fiber diameter is present, the probability of the adhesion of the ultra-fine fibers to the thick fiber along the thick fiber axis can be reduced. Consequently, the surface areas of the ultra-fine fibers in the present invention can become effective in removing leukocytes, so that the leukocyte-removing capability can be enhanced. Furthermore, since the ultra-fine fibers have a very small fiber diameter and are hardly intertwined with one another, a decrease of the pore content which inhibits the flow of blood can be suppressed, so that a satisfactory flowability of blood can be maintained.

In addition, in the first leukocyte-removing filter medium of the present invention, pores having a roundness of 1.7 or less are formed by the ultra-fine fibers. Here, the term "roundness" means a value obtained by the following procedure. In the same manner as in the above-mentioned fiber diameter measurement, the area ($S_1$) of the pore formed by the ultra-fine fibers in the photograph and its periphery length (L) are measured with a suitable apparatus such as an image analyzer. In this measurement, it is preferable to trace the shape of the pore formed by the ultra-fine fibers on tracing paper or the like and determined the area and the periphery length because they can be more accurately determined. Then, the area ($S_2$) of a circle having a periphery length of L is calculated, and the $S_2$ value is divided by the $S_1$ value. Such a measurement is carried out for a plurality of pores, specifically 100 or more pores. The term "roundness" in the present invention is defined as a value obtained by dividing the sum of quotients obtained by dividing the $S_2$ value by the $S_1$ value, by the number of pores. That is, the term "roundness" in the present invention is an indication of the similarity of the pores to circles, and the higher value of roundness means a higher similarity of the pores to circles.

A roundness of more than 1.7 is not suitable because leukocytes cannot be efficiently removed by the pores and erythrocytes pass through the pores while being unavoidably remarkably deformed, so that the filtration rate tends to be decreased by the resistance to passage of erythrocytes. The roundness is preferably 1.5 or less, more preferably 1.3 or less, most preferably 1.1 or less.

In the measurement of the roundness, the diameter of each pore formed by the ultra-fine fibers is converted to the diameter of a circle having the same periphery length L value as that of the pore, and the term "diameter in terms of a circle" is defined as the diameter of the circle. The diameter in terms of a circle is measured for 100 or more pores as in the measurement of the roundness, and the average of the measured values is taken as the diameter in terms of a circle. The value of the diameter in terms of a circle is preferably less than 20 $\mu$m and not less than 1 $\mu$m.

When the diameter in terms of a circle is less than 1 $\mu$m, leukocytes are captured in the upper parts of the pores and the pores are plugged therewith, so that the lower parts of the plugged pores do not contribute to the removal of leukocytes. Therefore the filtration rate is liable to be decreased by the plugging with the leukocytes which is undesirable. When the diameter in terms of a circle is 20 $\mu$m or more, the removal of leukocytes by the meshes is hardly expected, namely, the leukocyte-removing capability is deteriorated which is also undesirable. The diameter in terms of a circle is more preferably less than 10 $\mu$m and not less than 1 $\mu$m, and further is more preferably less than 8 $\mu$m and not less than 2 $\mu$m.

In addition, the coefficient of variation of the diameter in terms of a circle is preferably 50% or less. The term "coefficient of variation" used here means a value obtained as follows: in determining the diameter in terms of a circle, the standard deviation of a distribution, obtained by drawing a graph with the diameter of a circle for the conversion on the abscissa and the frequency of occurrence on the ordinate, is divided by the value of the diameter in terms of a circle and then multiplied by 100. The smaller the value of the coefficient of variation means there is less variation in the sizes of pores formed by the ultra-fine fibers. It is preferable that the coefficient of variation of the diameter in terms of a circle be small, namely, the sizes of the pores are uniform, because then one-sided flow of blood does not significantly occur. The coefficient of variation of the diameter in terms of a circle is more preferably 40% or less, further more preferably 30% or less, most preferably 20% or less.

In the above-mentioned measurement of the roundness and the diameter in terms of a circle, a checkered transparent sheet having lines drawn thereon lengthwise and widthwise at regular intervals of approximately 0.1 mm–10 mm is placed on each photograph, and the fiber diameter of a fiber at an intersection of vertical and horizontal lines, i.e., a lattice point, is measured. When the fiber diameter of the fiber at the lattice point is less than 1.0 $\mu$m and not less than 0.01 $\mu$m, the roundness and diameter in terms of a circle of a pore involving the ultra-fine fiber on the lattice point are determined. However, even though the fiber diameter of the fiber at the lattice point is less than 1.0 $\mu$m and not less than 0.01 $\mu$m, data obtained in, for example, the following cases are omitted: the case where the fiber diameter of the fiber forming the pore decreases to less than 0.01 $\mu$m or increases to 1.0 $\mu$m or more between the ends of the fiber, and the case where the fiber diameter of the fiber forming the pore is difficult to measure, for example, because a plurality of fibers are intertwined with one another. In addition, when the pore formed by the ultra-fine fiber is regarded as a pore through which the passage of blood is quite difficult, for example, a pore formed in close contact with the matrix material, the pore is not used as a sample for the measurement. That is, the roundness and the diameter in terms of a circle are measured for pores through which blood can pass and which are formed as spaces in the matrix material.

Figure 2:
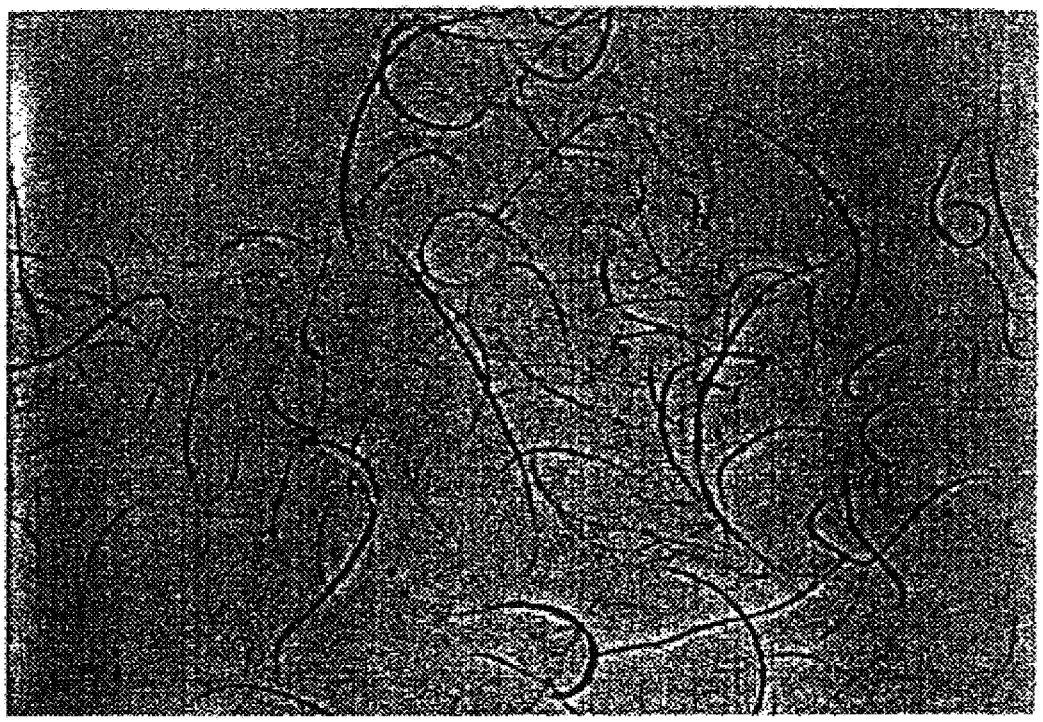
FIG. 2 is an optical micrograph of ultra-fine fibers having a remarkably curved shape.
Figure 3A:
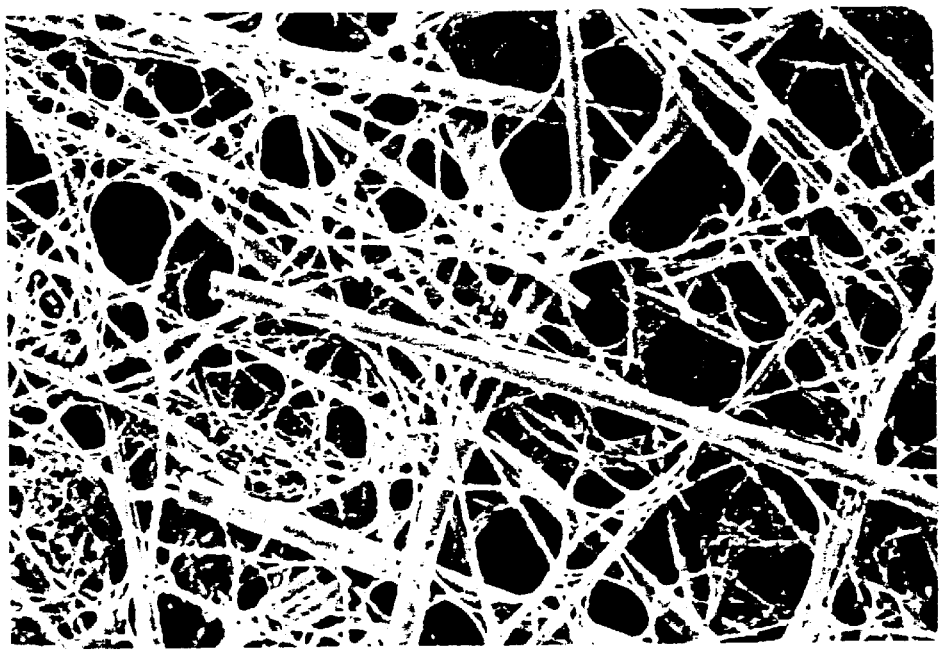
FIG. 3A is an electron micrograph of the surface of the first filter medium of the present invention having nearly round pores formed by ultra-fine fibers.

An example of the porous structure formed by the ultra-fine fibers in the present invention is shown in FIG. 3A, i.e., a structure comprising consecutive curvilinear pores similar to circles which is formed by such curved ultra-fine fibers as are shown in FIG. 2. However, any structure comprising polygonal pores is included in the porous structure according to the present invention so long as the polygonal pores has a roundness of 1.7 or less and a diameter in terms of a circle of less than 20 $\mu$m and not less than 1 $\mu$m.

Figure 3B:
FIG. 3B is an electron micrograph of a section of the filter medium shown in FIG. 3A.

For further enhancing leukocyte-removing capability, it is preferable that the porous structure according to the present invention be formed by the ultra-fine fibers on a plane perpendicular to the direction of flow of a leukocyte-containing fluid. Preferably, such a porous structure according to the present invention is substantially uniformly formed in the whole leukocyte-removing filter medium as shown in FIG. 3B, though it may be formed in a part of the filter medium, such as the surface layer.

Since the ultra-fine fibers used in the present invention have a fiber diameter of as small as less than 1.0 $\mu$m and not less than 0.01 $\mu$m, the surface area per unit volume of the filter medium can be greatly increased. Moreover, it is conjectured that, since a porous structure comprising pores of a suitable size is formed by the ultra-fine fibers on a plane perpendicular to the direction of flow of a leukocyte-containing fluid, leukocytes are efficiently captured by the pores.

Since the ultra-fine fibers used in the present invention are not in the form of a bundle but are so-called single fibers, each of which is in a split state, the void content of the leukocyte-removing filter medium can be kept high, and a porous structure comprising consecutive pores similar to circles is formed by the ultra-fine fibers. Therefore, in the leukocyte-removing filter medium, the resistance to passage of useful hemocyte components other than leukocytes, for example, hemocyte components not to be removed such as erythrocytes, can be markedly reduced, so that excellent blood-filtering characteristics can be exhibited with a good blood fluidity. The excellent blood-filtering characteristics could not be expected at all at the beginning and were a surprising effect. The following can be speculated: erythrocytes pass through the pores of the filter medium while being deformed, but they can pass therethrough without large deformation when the shape of pores of the filter medium is similar to a circle, and consequently it has become possible to maintain good blood fluidity without an increase of the resistance to passage of erythrocytes.

As a material for the ultra-fine fibers used in the present invention, any material can be used which hardly damages blood or hemocyte components and has a desirable fiber diameter and degree of curvature, or a material which has been processed by heat treatment, mechanical treatment, or the like so as to have a desirable fiber diameter and degree of curvature. These materials include natural fibers, semi-synthetic fibers, synthetic fibers, inorganic fibers, metallic fibers, etc. Of these, polymeric organic materials such as cellulose, cellulose acetate, polyacrylonitriles, polyesters, polyolefins, poly(vinyl alcohol)s, polyamides, etc. are preferable.

The second filter medium of the present invention is obtained by using fibril fibers obtained by fibrillating splittable fiber, as ultra-fine fibers. The fibril fibers can be obtained as fibers having a desirable shape, for example, they tend to have a single yarn shape with a small fiber diameter and they have a curved structure. Such fibril fibers can be obtained by fibrillating regenerated cellulose fiber or purified cellulose fiber by a very simple method such as subjecting the regenerated cellulose fiber or purified cellulose fiber to acid or alkali treatment and then physical stirring in a liquid by the use of a mixer.

The above-mentioned fibril fibers, however, contain fibril fibers with fiber diameters of 1.0 μm or more in some cases. Although a filter medium containing such fibers is also included in the filter medium of the present invention, such fibril fibers do not contribute to the remarkable enhancement of the leukocyte-removing capability, and hence it is preferable to remove fibril fibers with a large fiber diameter by filtering a suspension of fibril fibers prepared by physical stirring by means of a mixer or the like, through a suitable filter medium such as mesh.

Fibril fibers obtained by fibrillating fiber having a fibril index of 10 or more among the fibers mentioned above are preferable. The term "fibril index" used here means a value obtained by the method described in Japanese Patent Application Kohyo No. 8-501356. That is, eight fibers are placed in a 20-mL sample bottle containing 4 mL of water, and the sample bottle is shaken in a laboratory mechanical shaker of RO-10 type of Gerhardt AG. (Bonn, Germany) in 12 stages (or under shaking conditions equal thereto) for three hours, after which the number of fibrils per fiber length of 0.276 mm is counted under a microscope as the fibril index. Fibers having a fibril index of 10 or more are easy to fibrillate, give homogeneous fibrils, and tend to give fibrils relatively uniform in diameter. The fibril index is a measure of the ease of fibrillation, and the higher value of the fiber index means the easier fibrillation. The fibril index is preferably 15 or more, more preferably 20 or more, and most preferably 30 or more. Specific examples of fibers having a fibril index of 10 or more are vegetable fibers such as flax, cotton, etc.; synthetic fibers such as aromatic polyamide fiber, polyacrylonitrile fiber, etc.; and purified cellulose fiber.

Since the purified cellulose fiber tends to be fibrillated more easily than regenerated cellulose fiber, it is more preferable to use fibril fibers obtained by fibrillating the purified cellulose fiber.

The purified cellulose fiber is produced by "solvent spinning technique" in which natural fiber such as wood pulp is dissolved in a solvent such as an amine oxide and then formed into yarn. On the other hand, the regenerated cellulose fiber is produced by a process of cutting natural fiber into pieces by causing its chemical change in a step of producing cellulose, and then forming the pieces into yarn. Probably because of such difference between the production processes, the purified cellulose fiber has a very highly oriented microfibril structure therein. Moreover, the purified cellulose fiber has almost no skin layer in the fiber surface portion or has, if any, only a very soft skin layer. Consequently, the purified cellulose fiber is easily fibrillated by physical stimulation by a mixer or the like and can be made into fibril fibers relatively uniform in fiber diameter. On the other hand, the regenerated cellulose fiber has a lower orientation degree of microfibril structure and a thicker skin layer in the fiber surface layer than does the purified cellulose fiber, and hence tends to have difficulty in providing acceptable fibril fibers as compared with the purified cellulose fiber. Furthermore, fibril fibers obtained from the regenerated cellulose fiber tend to have a somewhat larger fiber diameter and greater variation of the fiber diameter than do fibril fibers obtained from the purified cellulose fiber. Therefore, it is preferable to obtain fibril fibers by fibrillating the purified cellulose fiber.

Of fibril fibers, those having a very low degree of swelling of fiber length with water are preferable. More specifically, fibril fibers having a degree of swelling of fiber length of 1.0% or less are preferable. The term "degree of swelling of fiber length with water" used here means a value defined by the following equation (1) by measuring the fiber length of one and the same fibril fiber in a dried state and a water-swollen state under a microscope:

$$\text{(Degree of swelling of fiber length with water)} = \frac{\left(\begin{array}{c}\text{Fiber length at}\\\text{water-swollen state}\end{array}\right) - \left(\begin{array}{c}\text{Fiber length}\\\text{at dry state}\end{array}\right)}{\text{(Fiber length at dry state)}} - 1 \times 100(\%) \quad (1)$$

The fiber length can be directly measured under a microscope, though since the fibril fiber is often curved, for example, it is preferable to take a micrograph of the fibril fiber and measure the length on the micrograph or with an image analyzer. The number of measurements made is preferably statistically significant.

When the degree of swelling of fiber length with water of the fibril fibers is more than 1.0%, the fibrils absorb water the moment fibrils in a dried state come into contact with blood, and hence there is undesirably a strong probability that the surfaces of hemocytes such as erythrocytes and platelets are damaged. Moreover, when the degree of swelling of fiber length with water is more than 1.0%, there is also a possibility that the fibrils are changed in shape the moment they come into contact with blood, resulting in a changed structure of the leukocyte-removing filter medium. The degree of swelling of fiber length with water is preferably in a range of 0.5% or less, more preferably 0.1% or less, most preferably 0.05% or less.

In addition, when the degree of swelling of fibril fiber length with water in the present invention is 1.0% or less, the above-mentioned porous structure is properly maintained with little change, even if drying and wetting are repeated during the production or use of the leukocyte-removing filter medium. Specific examples of the fibers having a degree of swelling of fiber length with water of 1.0% or less are synthetic fibers such as polyester fiber, aromatic polyamide fiber, polyacrylonitrile fiber, etc., and purified cellulose fiber.

Fibril fibers of cellulose are preferable because they are hardly cut in spite of their small fiber diameter and they are suitably soft, so that they permit passage of erythrocytes therethrough without excessive deformation of the erythrocytes, have a low resistance to passage of a liquid, and cause little damage to the erythrocytes. It can be speculated that the fibril fibers of cellulose are thin and hence have such a strong affinity for leukocytes that the leukocytes are firmly captured.

Furthermore, since the material cellulose itself has such a low affinity for hemocytes such as erythrocytes and platelets that it hardly stimulates these cells, its hemocompatibility is ideal.

Fibril fibers are described as a preferable example of ultra-fine fibers also in the case of the above-mentioned preceding invention, but the following knowledge was obtained in the present invention for the first time: the leukocyte-removing capability can be further enhanced by using fibril fibers obtained by fibrillation of fiber having a fibril index of 10 or more, or purified cellulose fiber, or using fibril fibers having a degree of swelling of 1.0% or less.

In the second filter medium of the present invention, the ultra-fine fibers preferably possess predetermined degree of curvature, roundness, or diameter in terms of a circle as in the first filter medium of the present invention.

In each of the first and second filter media of the present invention, the content of the ultra-fine fibers is less than 50 wt % and not less than 0.1 wt % based on the weight of the filter medium. A content of the ultra-fine fibers of more than 50 wt % is not suitable because the pore size is decreased, so that the flowability of blood is liable to be deteriorated. A content of the ultra-fine fibers of less than 0.1 wt % is not suitable because the leukocyte-removing capability is liable to be not sufficient. The content of ultra-fine fibers is preferably less than 20 wt % and not less than 1 wt %.

The content of the ultra-fine fibers can be measured by the same method as in the preceding invention and/or either of the methods exemplified below. The methods include, for example, a method of extracting the ultra-fine fibers with a suitable solvent, and measuring the weight of the ultra-fine fibers in the extract solution, and a method of measuring the content by analyzing the composition of the extract solution or the leukocyte-removing filter medium by utilizing a differential scanning calorimeter, high performance liquid chromatography (HPLC), nuclear magnetic resonance spectrum (NMR), elemental analysis, X-rays, infrared spectrum (IR) or the like. Particularly when a material for the ultra-fine fibers is cellulose, the content may be measured by decomposing the ultra-fine fibers into glucose with a suitable enzyme such as cellulase, and determining the amount of the glucose. When fiber having a large fiber diameter is present together with the ultra-fine fibers and the fiber having a large fiber diameter, and the ultra-fine fibers coexist substantially uniformly in the whole filter medium, the content of the ultra-fine fibers may be measured by the following method. The fiber diameter and fiber length of each fiber in a photograph taken by the use of a scanning electron microscope are measured, and a graph is drawn by plotting the fiber diameter as abscissa and the fiber length as ordinate. The fiber volume of fibers having each fiber diameter is determined, and the weight of the fibers having each fiber diameter is calculated by multiplying the fiber volume by the fiber density. The sum of the weight values thus obtained is taken as the fiber weight. The content may be determined by dividing the weight of ultra-fine fibers with a fiber diameter of less than 1.0 $\mu$m and not less than 0.01 $\mu$m by the fiber weight. The term "fiber length" used here means a cumulative value. That is, when a plurality of fibers having the same fiber diameter are measured, the total length of these fibers is used. Even if several kinds of fibers are present as a mixture, the average fiber diameter of fibers of each kind may be used when the fiber diameters of the fibers of each kind can be considered to be substantially uniform.

The fiber length referred to here is measured as follows: in each fiber photographed by the use of a scanning electron microscope, both ends of a portion regarded as a substantially single fiber in the photograph are chosen as starting points, and the actual length of the fiber between the starting points thus chosen is measured with an apparatus such as an image analyzer and suitable instruments. However, for example, when the fiber to be measured is intertwined with another fiber between both ends and hence cannot be traced, or when the fiber to be measured cannot be wholly seen because another fiber obstructs the view of the fiber to be measured, a point from which the fiber to be measured is intertwined with the other fiber or gets behind the other fiber is chosen as a starting point.

The ultra-fine fibers are preferably mixed in the whole filter medium. However, if it is difficult to mix the ultra-fine fibers in the filter medium so that they may be present also in the innermost of the filter medium, owing to a restriction by a production process of the filter medium, the ultra-fine fibers may be mixed in one surface or both surfaces of the filter medium. When the ultra-fine fibers are mixed in the filter medium so that they may be present also in the innermost of the filter medium, the content of the ultra-fine fibers is adjusted to less than 50 wt % and not less than 1 wt %, preferably less than 20 wt % and not less than 1 wt %, most preferably less than 10 wt % and not less than 2 wt %. When the ultra-fine fibers are mixed in one surface or both surfaces of the filter medium, the content of the ultra-fine fibers is adjusted to less than 10 wt % and not less than 0.1 wt %, preferably less than 6 wt % and not less than 1 wt %, most preferably less than 4 wt % and not less than 1 wt %.

The matrix usable in each of the first and second filter media of the present invention includes, for example, a fiber assembly obtained by using fiber with a large fiber diameter as a matrix material; a porous membrane and a spongy structure, which have interconnecting voids; and a particle assembly obtained by using particles as a matrix material. Of these matrices, in particular, the fiber assembly obtained by using fiber with a large fiber diameter as a matrix material is preferably used. As the matrix and a matrix material, those obtained from any material can be used so long as they hardly damage blood or hemocyte components. Specific examples thereof are matrices and matrix materials, which are obtained from the same materials as in the preceding invention, such as polyurethanes, polyesters, polyolefins, polyamides, polystyrenes, polyacrylonitriles, cellulose, cellulose acetate, etc. Glass fiber can also be preferably used when its surface is coated with a material which hardly damages blood or hemocyte components.

Each of the first and second filter media of the present invention is preferably in a form in which the ultra-fine fibers and the matrix materials are mixed, not a form in which the ultra-fine fibers are held by the matrix material. This is because the mixing of the matrix material makes it possible to increase the mechanical strength of the filter medium and improve the ease of handling in a filter medium production process.

When fiber having a large fiber diameter is used as the matrix material, its fiber diameter is suitably less than 30 $\mu$m and not less than 1 $\mu$m. A fiber diameter of less than 1 $\mu$m is not suitable because the pore size of the matrix formed of the matrix material is too small, so that the blood filtration time is liable to be elongated. A fiber diameter of 30 $\mu$m or more is not suitable because the pore size of the matrix is too large, so that holding the ultra-fine fibers used in the present invention is liable to be difficult. The fiber diameter is preferably less than 10 $\mu$m and not less than 1 $\mu$m, more preferably less than 3 $\mu$m and not less than 1 $\mu$m. As the fiber having a large fiber diameter, either short fibers or long fibers may be used. When long fibers are used as the matrix material, their fiber length is preferably 10 mm or more. However, employment of short fibers having a fiber length of less than 10 mm is preferable to employment of long fibers having a fiber length of 10 mm or more because it facilitates the production of a leukocyte-removing filter medium containing the ultra-fine fibers according to the present invention which are substantially uniformly mixed therein (combined with the matrix material). When short fibers are used as the matrix material, their fiber length is less than 10 mm and not less than 0.1 mm, preferably less than 7 mm and not less than 1 mm, more preferably less than 5 mm and not less than 2 mm. Here, the fiber length of the short fibers refers to the average of measured values of the fiber lengths of 50 or more fibers.

When a porous membrane or a spongy structure is used as the matrix which has interconnecting voids, the average pore size is suitably less than 100 $\mu$m and not less than 1 $\mu$m. A measuring method of the average pore size and its preferable range are the same as in the preceding invention.

When particles are used as the matrix material, the average particle diameter is suitably less than 300 $\mu$m and not less than 1 $\mu$m. When the particles are packed into a suitable container, an average particle diameter of less than 1 $\mu$m is not suitable because the pore sizes of pores formed among the particles are too small, so that the blood filtration time is liable to be increased. On the other hand, an average particle diameter of 300 $\mu$m or more is not desirable because the spaces among the particles are too large, so that holding the ultra-fine fibers used in the present invention becomes difficult. The average particle diameter is more preferably less than 50 $\mu$m and not less than 5 $\mu$m, most preferably less than 20 $\mu$m and not less than 6 $\mu$m. Here, the average particle diameter refers to the average of particle diameters measured by photographing by the use of a scanning electron microscope, and is obtained by carrying out the measurement for 50 or more particles.

The leukocyte-removing filter medium of the present invention may be composed of fiber having a branched structure obtained by uniting short fibers and ultra-fine fibers in a body so that the branch-like ultra-fine fibers may branch from the short fibers used as, so to speak, trunks, or the filter medium may be composed of a mixture of such fibers having a branched structure and monofilament-like short fibers and/or ultra-fine fibers. The term "fiber having a branched structure" used here means fibers composed of both trunk-like short fibers having a large fiber diameter and branch-like ultra-fine fibers having a small fiber diameter. An example is fiber having a branched structure formed by branching of branch-like fibers having a fiber diameter of less than 1.0 $\mu$m and not less than 0.01 $\mu$m from trunk-like fibers having a fiber diameter of less than 30 $\mu$m and not less than 1 $\mu$m and a fiber length of less than 10 mm and not less than 0.1 mm.

The third leukocyte-removing filter medium of the present invention is a non-woven fabric made of splittable cellulose containing ultra-fine fibers, i.e., cellulose microfibrils having a fiber diameter of less than 1.0 $\mu$m and not less than 0.01 $\mu$m. The non-woven fabric made of splittable cellulose containing cellulose microfibrils is a mixture of cellulose microfibrils having a fiber diameter of less than 1.0 $\mu$m and not less than 0.01 $\mu$m and incompletely fibrillated cellulose fiber having a fiber diameter of less than 30 $\mu$m and not less than 1 $\mu$m which mixture is in the form of non-woven fabric. The splittable cellulose fiber has been split to random diameters, and portions containing fiber having a branched structure composed of the splittable cellulose fiber as trunk and branch-like cellulose microfibrils branching therefrom are also present in the non-woven fabric. In this case, the splittable cellulose fiber as trunk is a matrix material.

When the non-woven fabric made of splittable cellulose is used as the leukocyte-removing filter medium, the presence ratio of the cellulose microfibrils having a fiber diameter of less than 1.0 $\mu$m and not less than 0.01 $\mu$m to the cellulose fiber having a fiber diameter of less than 30 $\mu$m and not less than 1 $\mu$m is preferably such that the total area of the cellulose microfibrils is less than 50% and not less than 1.0% based on the area of the whole cellulose fiber when the filter medium is observed by a scanning electron microscope. When this percentage is less than 1.0%, the amount of the fibril fibers is undesirably not sufficient to capture leukocytes in a leukocyte-containing fluid. When the percentage is 50% or more, the amount of the fibril fibers is undesirably too large, resulting in an unsatisfactory flow of the leukocyte-containing fluid. The percentage is more preferably in a range of less than 45% and not less than 5%, still more preferably less than 30% and not less than 10%.

Since all the fibers of the non-woven fabric made of splittable cellulose are made of cellulose, the non-woven fabric is a material naturally having such a low affinity for hemocytes such as erythrocytes and platelets that it hardly stimulates these cells. Therefore, the non-woven fabric has an ideal hemocompatibility. Specific examples of the splittable cellulose fiber are cellulose type semi-synthetic fibers such as acetate fiber, triacetate fiber, etc., regenerated cellulose fiber, and purified cellulose fiber.

In the third filter medium of the present invention, the cellulose microfibrils as ultra-fine fibers preferably possess a predetermined degree of curvature, roundness, or diameter in terms of circle as in the first and second filter media of the present invention. The third filter medium of the present invention is preferably a non-woven fabric made of splittable cellulose by microfibrillating cellulose fiber or purified cellulose fiber, which has a fibril index of 10 or more, as in the second filter medium, and the cellulose microfibrils preferably have a degree of swelling of fiber length with water of 1.0% or less.

In the filter media of the present invention, the ratio of the average pore size of pores of the matrix formed of the matrix material to the average fiber diameter of the ultra-fine fibers is less than 2,000 and not less than 2, preferably less than 200 and not less than 6, more preferably less than 100 and not less than 10, for the purpose of keeping good flow of a leukocyte-containing fluid. The range of the ratio of the average pore size of the matrix to the average fiber diameter of the ultra-fine fibers, etc. are the same as in the above-mentioned preceding invention.

When the matrix is composed of fibers having a large fiber diameter of less than 30 $\mu$m and not less than 1 $\mu$m, the ratio of the average fiber diameter of the matrix fibers to the average fiber diameter of the ultra-fine fibers is less than 300 and not less than 1.5, more preferably less than 60 and not less than 2, most preferably less than 20 and not less than 2, for the purpose of keeping good flow of a leukocyte-containing fluid. Here, the average fiber diameter of the fibers having a large fiber diameter is measured in the same manner as for the above-mentioned measurement of the average fiber diameter of the ultra-fine fibers.

The average pore size of each leukocyte-removing filter medium containing the ultra-fine fibers of the present invention is preferably less than 100 $\mu$m and not less than 1.0 $\mu$m.

Here, the average pore size refers to a value obtained by measurement by a bubble point method. For example, the average pore size (mean·flow·pore size: MFP) can be measured with Coulter$^R$ Porometer manufactured by Coulter Electronics Inc., by using about 50 mg of a sample. When the average pore size is less than 1.0 $\mu$m, the flow of a leukocyte-containing fluid is undesirably difficult. When the pore size is 100 μm or more, the ultra-fine fibers are often undesirably difficult to hold. The average pore size is more preferably in a range of less than 20 μm and not less than 3.0 μm, further more preferably less than 12 μm and not less than 5.0 μm.

The void content of each leukocyte-removing filter medium of the present invention is preferably less than 95% and not less than 50%. The reason is the same as in the preceding invention. The void content is measured by the same method as in the preceding invention.

The thickness of each leukocyte-removing filter medium of the present invention is preferably less than 30 mm and not less than 0.05 mm in the direction of flow of a leukocyte-containing fluid, for the same reason as in the preceding invention. The thickness is more preferably less than 10 mm and not less than 0.05 mm, most preferably less than 1 mm and not less than 0.1 mm.

In addition, each leukocyte-removing filter medium of the present invention may be post-processed with a binder such as a water-insoluble solution as in the preceding invention, and moreover its surface may be modified into a surface to which platelets and erythrocytes hardly adhere. As method and material for the surface modification, the same method and material as in the preceding invention are preferably used.

For providing a process for producing a leukocyte-removing filter medium, the second object of the present invention, the present inventors earnestly investigated and consequently found that the filter medium of the present invention can be produced by the following process.

A process in which a matrix material is mixed with ultra-fine fibers having a fiber diameter of less than 1.0 μm and not less than 0.01 μm, and then a filter medium as a filter medium of the present invention is produced containing the ultra-fine fibers in an amount of less than 50 wt % and not less than 0.1 wt %, the degree of curvature of the ultra-fine fibers being 1.2 or more, and/or the ultra-fine fibers forming pores having a roundness of 1.7 or less (this process is hereinafter referred to as the first production process of the present invention).

Alternatively, the process is one which comprises mixing a matrix material with fibril fibers as ultra-fine fibers, or making a dispersion of fibril fibers in a matrix made of a matrix material into paper, and thereby producing a filter medium of the present invention containing the fibril fibers in an amount of less than 50 wt % and not less than 0.1 wt % (this process is hereinafter referred to as the second production process of the present invention). Alternatively, the process is one which comprises fibrillating a portion of splittable cellulose fiber to obtain a filter medium of the present invention which is a non-woven fabric of splittable cellulose containing microfibrils having a fiber diameter of less than 1.0 μm and not less than 0.01 μm (this process is hereinafter referred to as the third production process of the present invention). Alternatively, the process is one which comprises mixing a matrix material with splittable fiber and then splitting the splittable fiber into ultra-fine fibers having a fiber diameter of less than 1.0 μm and not less than 0.01 μm, to produce a filter medium of the present invention containing the ultra-fine fibers in an amount of less than 50 wt % and not less than 0.1 wt %, the degree of curvature of the ultra-fine fibers being 1.2 or more, and/or the ultra-fine fibers forming pores having a roundness of 1.7 or less (this process is hereinafter referred to as the fourth production process of the present invention).

In the first production process of the present invention, since the filter medium is produced after previously mixing a matrix material with ultra-fine fibers, the ultra-fine fibers can be mixed in the whole of the resulting filter medium. The preceding invention discloses a process for producing a filter medium which comprises pouring a dispersion of ultra-fine fibers into a vessel containing a porous element as matrix, then discharging water, and thereby holding the ultra-fine fibers in the surface layer portion of the porous element. That is, according to this production process, a filter medium comprising the porous element already having a porous structure, such as a non-woven fabric, porous membrane or the like, and the ultra-fine fibers held in the surface layer of the porous element can be obtained.

The preceding invention discloses the fact that ultra-fine fibers can be held in a filter medium so that the ultra-fine fibers may be present also in the innermost part of the filter medium, by reducing the fiber length of the ultra-fine fibers, or treating the filter medium with a high-pressure liquid jet in post-processing. However, according to this method, the amount of ultra-fine fibers inside the porous element is smaller than in the surface layer portion of the porous element, so that it is not easy to hold the ultra-fine fibers so that they may be present at a uniform density in the direction of thickness of the porous element.

On the other hand, in the first production process of the present invention, since the filter medium is produced after previously mixing a matrix material with ultra-fine fibers, the density of the ultra-fine fibers present in the direction of thickness of the resulting filter medium can be made very uniform.

Figure 1B:
FIG. 1B is an electron micrograph of a section of the filter medium shown in FIG. 1A.

In addition, the first production process of the present invention is a very simple production process in which, unlike in the preceding invention, the ultra-fine fibers can be made present in the whole filter medium without reducing the fiber length of the ultra-fine fibers or treating the filter medium with a high-pressure liquid jet, and, moreover, the matrix and the ultra-fine fibers can be allowed to coexist as a mixture. FIG. 1B is an electron micrograph in the direction of thickness of the filter medium of the preceding invention. FIG. 3B is an electron micrograph in the direction of thickness of the filter medium of the present invention. As is clear from comparison between FIG. 1B and FIG. 3B, the filter medium of the preceding invention has many of the ultra-fine fibers in its surface layer portion, while the filter medium of the present invention is in such a form that the ultra-fine fibers are mixed in the whole filter medium.

The filter medium obtained by the first production process of the present invention has a higher leukocyte-removing capability per unit volume because the ultra-fine fibers are uniformly mixed in the whole filter medium.

The first production process of the present invention is explained below in further detail. In the first production process of the present invention, the same ultra-fine fibers as in the preceding invention can be used. Matrix material which can be used in the first production process of the present invention includes short fibers having a fiber diameter of less than 30 μm and not less than 1 μm and a fiber length of less than 10 mm and not less than 0.1 mm; particles having a particle diameter of less than 300 μm and not less than 1 μm; or polymer solutions capable of forming a porous membrane or a spongy structure.

When the short fibers or particles are used as the matrix material in the first production process of the present invention, a process is exemplified which comprises preparing a dispersion by previously mixing and dispersing both the matrix material and ultra-fine fibers, pouring the dispersion into a vessel containing a suitable supporting fabric (e.g. mesh) located therein for preventing the loss of the ultra-fine fibers and the matrix material, accumulating the dispersion and then discharging water, and drying the residue to produce a sheet-like filter medium.

In this case, dispersions of the ultra-fine fibers and the matrix material, respectively, may be prepared and then mixed, or the ultra-fine fibers and the matrix material are directly mixed and dispersed in one and the same dispersion medium. As the dispersion medium for dispersing each or both of the ultra-fine fibers and the matrix material, any dispersion medium can be used so long as the ultra-fine fibers and the matrix material can be uniformly dispersed therein, and are not soluble therein. The dispersion medium includes water, alcohols, etc. If necessary, surfactants and thickening agents may be added to the dispersion medium. In such a paper making process, the concentration of the fibers or particles in the dispersion is preferably about 0.01 g/L to about 3 g/L. When a surfactant and/or a thickening agent are added, the concentration thereof is preferably 0.001% to 5%.

According to the first production process of the present invention, the filter medium can be produced by using fiber having a branched structure obtained by uniting short fibers as a matrix material and ultra-fine fibers in a body. Such fiber having a branched structure can be obtained by subjecting splittable fiber or splittable conjugate fiber to a treatment such as physical stirring using a mixer, jetting of a high-pressure liquid jet, or treatment using a high-pressure homogenizer, under relatively mild conditions under which the branch-like ultra-fine fibers formed by splitting are not released from the short fibers as trunks. In addition, a filter medium containing the ultra-fine fibers mixed in the whole filter medium can also be produced by dispersing the obtained fiber having a branched structure, in a dispersion medium and then making the resulting dispersion into paper.

When such a polymer solution capable of forming a porous membrane or a spongy structure as described in JP-A-4-212373 is used as a matrix material in the first production process of the present invention, a process can be adopted which comprises mixing ultra-fine fibers with the polymer solution, and immersing the resulting mixture in a suitable solidifying medium and then, optionally, into a solvent for dissolving away a pore-forming agent, to form the porous membrane or spongy structure and, at the same time, a filter medium containing the ultra-fine fibers mixed in the whole porous membrane or spongy structure.

The second production process of the present invention is a process for producing a filter medium by mixing a matrix material with fibril fibers having a fiber diameter of less than 1.0 $\mu$m and not less than 0.01 $\mu$m, or making a dispersion of such fibril fibers in a matrix made of a matrix material into paper. Here, the fibril fibers refer to fibers obtained by fibrillating fiber having a fibril index of 10 or more, and/or fibril fibers obtained by fibrillating purified cellulose, and/or fibril fibers having a degree of swelling of fiber length with water of 1.0% or less. When such fibril fibers are used, either a method of mixing the fibril fibers in the whole filter medium, or a method of mixing the fibril fibers only in the surface layer portion of the filter medium may be adopted. The above-mentioned fibril fibers are characterized in that they have a small fiber diameter and a uniform fiber diameter distribution and undergo little change in shape such as swelling during treatment of blood. Therefore, a surface area effective in removing leukocytes can be sufficiently assured, and it is possible to increase the number of fiber crossover points of the ultra-fine fibers which efficiently remove leukocytes by adhesion. Therefore, the filter medium obtained by using the above-mentioned fibril fibers can exhibit a sufficient leukocyte-removing capability even when it is in such a form that the fibril fibers are mixed only in the surface layer portion of the filter medium. The second production process of the present invention is explained below in further detail.

The fibril fibers used in the second production process of the present invention can be obtained by carrying out fibrillation by the same method as in the preceding invention.

When a filter medium is produced after previously mixing a matrix material with the fibril fibers in the case of the second production process of the present invention, the filter medium is produced in the same manner as in the first production process of the present invention. When a filter medium is produced by making a dispersion of the fibril fibers in a matrix made of a matrix material into paper, in the case of the second production process of the present invention, the filter medium can be produced by the same paper making method as in the preceding invention. Alternatively, the fibril fibers can be mixed in a filter medium so as to be present also in the innermost part of the filter medium, by preparing a dispersion of a matrix material and a dispersion of the fibril fibers, and making paper using the dispersion of the matrix material, and making paper using the dispersion of the fibril fibers alternately two or more times as follows: a portion of the dispersion of the fibril fibers is made into paper on a sheet-like matrix obtained by making a portion of the dispersion of the matrix material into paper, and then another portion of the dispersion of the matrix material is made into paper thereon.

In the second production process of the present invention, the matrix made of a matrix material includes fiber assemblies such as non-woven fabric, woven fabric, knitted fabric, etc., which are composed of fibers having a fiber diameter of less than 30 $\mu$m and not less than 1 $\mu$m; particle assemblies obtained by laminating a large number of particles having an average particle diameter of less than 300 $\mu$m and not less than 1 $\mu$m; porous membranes having interconnecting voids and an average pore size of less than 100 $\mu$m and not less than 1 $\mu$m; spongy structures; and meshes. The matrix made of fibers refers to a matrix obtained by forming short fibers having a fiber length of less than 10 mm and not less than 0.1 mm or long fibers having a fiber length of 10 mm or more into non-woven fabric, woven fabric or knitted fabric. Of these, the matrix in the form of non-woven fabric is preferable. A dispersion of the fibril fibers is poured into a vessel containing such a matrix, and water is discharged, whereby a filter medium containing the fibril fibers mixed in the surface layer portion of the filter medium can be produced.

In the case of the first and second production processes of the present invention, when a filter medium is produced by previously mixing a matrix material with a dispersion of ultra-fine fibers and then making the resulting mixture into paper, the paper making may be conducted on a suitable supporting fabric such as non-woven fabric or mesh, or the leukocyte-removing filter medium may be held between supporting fabrics after the paper making, in order to improve the ease of handling of the filter medium during the production.

The third production process of the present invention is a process for producing a filter medium composed of a non-woven fabric of splittable cellulose containing cellulose microfibrils having a fiber diameter of less than 1.0 $\mu$m and not less than 0.01 $\mu$m.

As the third production process of the present invention, a process of producing a non-woven fabric composed of splittable cellulose fiber and then microfibrillating a portion of the non-woven fabric by post-processing, and a process of microfibrillating splittable cellulose fiber and then forming the microfibrillated fiber into non-woven fabric are mentioned. In the former process, there are mentioned, for example, a water-flow entangling process comprising directing a jet of high-pressure liquid at non-woven fabric of splittable cellulose to fibrillate the splittable cellulose fiber and to entangle the resulting fibers, and a process of fibrillating non-woven fabric of splittable cellulose by sand washing with sandpaper or the like. According to either of these processes, a filter medium containing microfibrils mainly in the surface layer portion of the filter medium can be obtained. In the latter process, for example, a process of fibrillating the splittable cellulose fiber with a mixer, high-pressure homogenizer, beater, refiner or the like at first as in the preceding invention, and then forming the fibrillated fiber into non-woven fabric by a paper making method or the like is mentioned. According to this process, microfibrils can be mixed in the whole of the resulting filter medium.

After a filter medium is produced by any of the first, second and third production processes of the present invention, its treatment with a high-pressure liquid at less than 200 kg/cm$^2$ and not less than about 3 kg/cm$^2$ may be carried out as post-processing. Such a post-processing is preferable because it can accelerate mutual entanglement of fibers to increase the mechanical strength.

In either of the second and third production processes of the present invention, when the product obtained by fibrillation with a mixer or the like is heated, fibril fibers or cellulose microfibrils are easily formed which have a higher degree of curvature. Therefore, such a post-processing is preferable.

The fourth production process of the present invention is a process for producing a filter medium by treating a fiber composite composed of a matrix material and splittable fiber, with a high-pressure liquid to split the splittable fiber into ultra-fine fibers and at the same time entangle the ultra-fine fibers with the matrix material. In detail, a fiber composite composed of a matrix material and splittable fiber is treated with a high-pressure liquid jet at less than 200 kg/cm$^2$ and not less than 30 kg/cm$^2$, whereby the splittable fiber is split into ultra-fine fibers having a fiber diameter of less than 1.0 $\mu$m and not less than 0.01 $\mu$m and at the same time the ultra-fine fibers are entangled with the matrix material. The fourth production process of the present invention is explained below in further detail.

The splittable fiber in the fourth production process of the present invention is the same as any of those exemplified in the case of the preceding invention, namely, it refers to fiber which can be split by treatment with a high-pressure liquid at less than 200 kg/cm$^2$ and not less than 30 kg/cm$^2$ to give ultra-fine fibers having a fiber diameter of less than 1.0 $\mu$m and not less than 0.01 $\mu$m. Of the splittable fibers exemplified in the case of the preceding invention, regenerated cellulose fiber and purified cellulose fiber are especially preferable because ultra-fine fibers obtained by splitting them by treatment with a high-pressure liquid have a very small fiber diameter and moreover a curved shape. If necessary, such cellulose fiber is preferably subjected to pretreatment such as acid treatment or alkali treatment because its splitting is facilitated.

The matrix material in the fourth production process of the present invention is the same as any of those described in the case of the first production process of the present invention, and is particularly preferable to be fiber having a diameter of less than 30 $\mu$m and not less than 1.0 $\mu$m. The term "treatment with a high-pressure liquid" in the fourth production process of the present invention means that a liquid pressurized at less than 200 kg/cm$^2$ and not less than 30 kg/cm$^2$ is jetted through a large number of nozzles with a diameter of about 0.1 mm to about 2.0 mm to hit hard a fiber composite composed of a matrix material and splittable fiber. In general, high-pressure liquid treatments are classified into pillar-shaped jet treatment and spray jet treatment according to the shape of jet of the liquid. The pillar-shaped jet is suitable for the fourth production process of the present invention. The treatment with the high-pressure liquid is preferably carried out while changing the relative positions of the nozzles and the fiber composite, for example, horizontally or spirally, so that the liquid jetted through the nozzles may hit the fiber composite uniformly and efficiently. Although such a liquid includes various liquids, water is the most suitable from the viewpoint of ease of handling and economical benefit.

The fourth production process of the present invention using the matrix material and the splittable fiber is described below in further detail by giving an example. Commercially available regenerated cellulose fiber or purified cellulose fiber having a fiber diameter of about 10 $\mu$m is used as the splittable fiber. This fiber is cut to a predetermined length and then subjected to acid treatment and/or alkali treatment as in the preceding invention. The thus pretreated splittable fiber and poly(ethylene terephthalate) short fibers having a fiber diameter of less than 30 $\mu$m and not less than 1.0 $\mu$m and a fiber length of less than 10 mm and not less than 0.1 mm are made into paper by the same method as the paper making method described in the case of the first production process of the present invention to produce a fiber composite. Another example of process for producing the fiber composite is a dry cardaeray process. Any process may be adopted for producing the fiber composite without a particular limitation.

The fiber composite thus produced is subsequently treated with a high-pressure liquid jet at less than 200 kg/cm$^2$ and not less than 30 kg/cm$^2$ to split the splittable fiber and at the same time entangle the fibers with one another, and the fibers are dried, whereby a leukocyte-removing filter medium having a high strength can be produced. In the production of the filter medium, the fiber diameter after the splitting of the splittable fiber contained in the filter medium can be controlled, for example, by increasing the pressure at the high-pressure liquid treatment, elongating the time of the high-pressure liquid treatment, or reducing the thickness of the filter medium. By adjusting a method and conditions of the high-pressure liquid treatment, a filter medium having a structure in which the splittable fiber has been split only in the vicinity of one surface of the fiber composite, or a filter medium having a structure in which the splittable fiber has been split in the vicinity of each surface of the fiber composite can be obtained. In the high-pressure liquid treatment of the fiber composite, when a non-woven fabric having a fiber diameter of about 10 $\mu$m to about 20 $\mu$m, or the like is placed on each of the upper and lower sides of the fiber composite and the high-pressure liquid treatment is carried out, scattering of the fibers constituting the fiber composite can be reduced and the strength of the fiber composite can be increased by virtue of the above-mentioned non-woven fabrics.

Also, in the third production process of the present invention, the splittable cellulose fiber can be microfibrillated by employing such a method, and conditions of the high-pressure liquid treatment as are described in the case of the fourth production process of the present invention.

A leukocyte-removing filter medium can be produced by any of the above various processes. Of these processes, especially preferable is a process which makes it possible to mix ultra-fine fibers in the whole leukocyte-removing filter medium, and in which the filter medium is produced by paper making using short fibers and the ultra-fine fibers, which can be produced by simple production processes.

The third object of the present invention is to provide a leukocyte-removing filter apparatus which removes leukocytes from a leukocyte-containing fluid while minimizing loss of useful blood components and attaining a high leukocyte removal rate; providing a method for removing leukocytes using the apparatus; providing a leukocyte-removing filter apparatus which can attain an especially high leukocyte removal rate; and a method for removing leukocytes using this apparatus. The present inventors earnestly investigated and consequently found that the above object can be achieved by filtering a leukocyte-containing fluid by the use of a filter apparatus obtained by properly locating the filter medium of the present invention in a container at least having an inlet and an outlet.

The filter apparatus of the present invention is substantially the same as that of the preceding invention. That is, the filter apparatus has a sheet of or a laminate of two or more sheets of the filter medium of the present invention packed therein in the direction of flow of a leukocyte-containing fluid. For example, when the surface of the filter medium is modified by a coating, a relatively coarse filter medium may be inserted as the lowest layer. The filter apparatus may further contain other filter media upstream and/or downstream to the filter medium of the present invention. It is also possible to use the same prefilter as in the preceding invention in order to remove very small aggregates contained in a leukocyte-containing fluid.

In addition, the filter apparatus of the present invention preferably has a sectional area in a direction normal to the direction of flow of a leukocyte-containing fluid of less than 100 cm$^2$ and not less than 3 cm$^2$.

The method for removing leukocytes of the present invention is also the same as in the preceding invention, namely, it comprises filtering a leukocyte-containing fluid by the use of the filter apparatus of the present invention and recovering the filtrate. In detail, it is a method for removing leukocytes from a leukocyte-containing fluid which comprises using an apparatus comprising 1) an inlet, 2) a filter comprising the filter medium of the present invention, and 3) an outlet, introducing the leukocyte-containing fluid through the inlet, and recovering the filtrate obtained by filtration through the filter medium, through the outlet. The leukocyte-containing fluid includes, for example, whole blood products, concentrated red cell products and platelet concentrates, as well as body fluids.

As described above, the leukocyte-removing filter medium of the present invention has a very high affinity for leukocytes and hence a very satisfactory leukocyte-removing capability. Moreover, the filter medium is so good in allowing the flow of blood that a leukocyte-containing fluid can be efficiently treated without decreasing the blood filtration rate. Furthermore, the filter medium has such an excellent compatibility with blood that it hardly damages hemocyte components.

The present invention is illustrated below in further detail with reference to examples, which should not be construed as limiting the scope of the invention.

Reference Example

Example 1 of the preceding invention is described below as a reference example.

Ultra-fine fibers were prepared by the following process. As splittable fiber, cuprammonium rayon yarn having a fiber diameter of about 10 $\mu$m (Bemberg$^R$ yarn 40d/45f, manufactured by ASAHI Chemical Industry Co., Ltd.) was cut to a fiber length of about 3 mm. The resulting pieces were immersed in a 3 wt % aqueous sulfuric acid solution and subjected to acid treatment therein at 70° C. for 30 minutes with mild stirring at 60 rpm. The sulfuric acid was washed away with pure water, after which 1.5 g of the thus obtained fibers were dispersed in 1 L of pure water and vigorously stirred with a homogenizer at 10,000 rpm for 30 minutes to prepare ultra-fine fibers.

A polyester non-woven fabric with an average fiber diameter of 1.2 $\mu$m produced by a melt blow method, with a copolymer of 2-hydroxyethyl methacrylate (HEMA) and N,N-dimethyl-aminoethyl methacrylate (hereinafter abbreviated as DM) (the DM content in the copolymer was 3 mol %) was used as a matrix porous element. In detail, the above-mentioned polyester non-woven fabric was immersed in a 0.2% ethanolic solution of the above-mentioned copolymer at 40° C. for 1 minute, after which the excess copolymer solution was removed by light squeezing, and the thus treated non-woven fabric was packed into a container for exclusive use and dried while introducing nitrogen into the container. The porous element had an average pore size of 9.2 $\mu$m, a thickness of 0.2 mm, a bulk density of 0.2 g/cm$^3$, and a basis weight of 40 g/m$^2$. The average pore size was measured as follows: the pore size distribution was measured with Poresizer 9320 (Shimadzu Corp.) in a pressure range of 1 to 2,650 psia; the amount of mercury injected at a mercury injection pressure of 1 psia was taken as 0% and the amount of mercury injected at a mercury injection pressure of 2,650 psia was taken as 100%; and a pore size corresponding to an amount of mercury injected of 50% was taken as the average pore size. The above-mentioned porous element was cut into a perfectly round sheet with a diameter of 15 cm, and the bottom of a porcelain funnel with a diameter of 15 cm was covered with the sheet, after which pure water was accumulated to a height of about 10 cm above the surface of this porous element. Fifty milliliters of an aqueous dispersion of the ultra-fine fibers (fiber concentration 0.1 g/L) was gently poured into the pure water and mildly stirred, after which water was discharged from the bottom of the porcelain funnel at a time to support the ultra-fine fibers on the porous element, followed by vacuum drying at 40° C. for 16 hours, whereby a filter medium was obtained. The above procedure was repeated once more to produce a filter medium having the ultra-fine fibers supported on both sides, the right side and reverse side of the porous element.

The average fiber diameter of the fiber structure supported on the porous element was 0.29 $\mu$m. The average fiber diameter was measured by taking an electron micrograph of the obtained filter medium by the use of a scanning electron microscope (S-2460N, manufactured by Hitachi Ltd.), selecting some of the ultra-fine fibers at random, measuring the fiber diameter at 100 or more points of the selected ultra-fine fibers, and calculating the number average of the measured values. Thus, the ratio of the average pore size of the porous element to the average fiber diameter of the fiber structure is 31.7, and the ratio of the average fiber diameter of the porous element to the average fiber diameter of the fiber structure is 4.1.

The void content of the filter medium was 85% and the holding amount of the fiber structure was 1.1 wt % based on the weight of the filter medium. The void content was measured as follows. The dry weight ($W_1$) of a round sheet with a diameter of 25 mm cut out of the filter medium was measured, and its thickness was measured by the use of Peacok dial thickness gauge, followed by calculation of its volume (V). The sheet of the filter medium was immersed in pure water and deaeration was carried out for 30 seconds while applying ultrasonic waves, after which the weight ($W_2$) of the water-containing sheet of the filter medium was measured. The void content was calculated from the thus obtained values by the following calculation equation. In the following calculation equation, ρ is the density of pure water and 1.0 g/cm$^3$ was substituted for ρ in the present experiment.

Void content (%)=$(W_2-W_1) \times \rho \times 100/V$

The holding amount of the ultra-fine fibers was measured by the following method. That is, three round sheets with a diameter of 25 mm cut out of the filter medium were immersed in 5 mL of a solution prepared by dissolving 50 mg of cellulase (available from Wako Pure Chemical Industries, Ltd.) in 100 mL of acetate buffer (pH 4.8) having a concentration of 0.1 mol/L. The solution was mildly shaken at 50° C. for 24 hours to decompose the ultra-fine fibers into glucose, which was extracted. The glucose extracted after the decomposition was quantitated by using Glucose CII-Test Wako (available from Wako Pure Chemical Industries, Ltd.), a reagent for quantitating glucose, and the holding amount of the ultra-fine fibers introduced into the porous element was calculated from the amount of glucose.

A laminate (0.26 g) of 7 sheets of the filter medium produced in the manner described above was packed into a container having an effective filtration sectional area of 9.0 cm$^2$ (3.0 cm×3.0 cm), at a packing density of 0.21 g/cm$^3$ to produce a leukocyte-removing filter apparatus. The total volume of the filter medium was 1.26 cm$^3$. After centrifuging 456 mL of a whole blood product prepared by adding 56 mL of a CPD solution (composition: sodium citrate 26.3 g/L, citric acid 3.27 g/L, glucose 23.20 g/L, and sodium dihydrogenphosphate dihydrate 2.51 g/L) to 400 mL of blood, the platelet-rich plasma was removed, and 95 mL of a MAP solution (composition: sodium citrate 1.50 g/L, citric acid 0.20 g/L, glucose 7.21 g/L, sodium dihydrogenphosphate dihydrate 0.94 g/L, sodium chloride 4.97 g/L, adenine 0.14 g/L, and mannitol 14.57 g/L) was added to the residue to prepare an red cell concentrate (RC-MAP). After being preserved at 4° C. for 8 days, 50 g of the red cell concentrate (RC-MAP: hematocrit value 64%, number of leukocytes 3,425/μL) was filtered by using the above-mentioned leukocyte-removing filter apparatus. The temperature of the red cell concentrate immediately before the start of the filtration was 10° C. The filtration of the red cell concentrate by the use of the filter apparatus was carried out at a fall of 1.0 m until the red cell concentrate did not remain in a blood bag, and the filtered blood was recovered (the recovered red cell concentrate is hereinafter referred to as the recovered fluid). The average treatment rate in the filtration of the red cell concentrate was 11.6 g/min.

The volumes of the red cell concentrate before the filtration (hereinafter referred to as the fluid before filtration), and the recovered fluid and the number of leukocytes were measured, and the leukocyte residual rate was calculated.

Leukocyte residual rate=(number of leukocytes in recovered fluid)/(number of leukocytes in fluid before filtration)

Values for the volumes of the fluid before filtration and the recovered fluid were obtained by dividing their weights, respectively, by the specific gravity (1.075) of the blood product. The leukocyte concentration of the fluid before filtration was measured by pouring a 10-fold dilution of the fluid before filtration with Türk's solution into a Bürker-Türk hemocytometer, and counting leukocytes under an optical microscope. The leukocyte concentration of the recovered fluid was measured by the following method. The recovered fluid was diluted 5-fold with Leukoplate solution (manufactured by SOBIODA). The dilution was thoroughly mixed and then allowed to stand at room temperature for 6 to 10 minutes. This dilution was centrifuged at 2,750×g for 6 minutes, and the supernatant was removed to adjust the weight of the dilution to 1.02 g. The sample fluid thus obtained was thoroughly mixed and then poured into a Nageotte hemocytometer, and leukocytes were counted under an optical microscope, whereby the leukocyte concentration was measured. As a result, the leukocyte residual rate was found to be $10^{-2.71}$.

EXAMPLE 1

Regenerated cellulose fiber having a fiber diameter of about 10 μm (Bemberg® continuous-spinning fiber, manufactured by ASAHI Chemical Industry Co., Ltd.) was cut to a fiber length of about 7 mm. The resulting fiber pieces were immersed in an aqueous sodium hydroxide solution (1 wt %) at about 5° C. and stirred at 60 rpm for 180 minutes. After washing with water, the pieces of the regenerated cellulose fiber were dispersed in water to a concentration of 2.0 g/L and vigorously stirred with a mixer at 10,000 rpm for 30 minutes. The resulting fibril fiber suspension was immersed in hot water at about 80° C. and mildly stirred for 60 minutes. Thus, a suspension of fibril fibers formed by fibrillation of the cellulose fiber was prepared. When the fibril fibers obtained were photographed by using a scanning electron microscope, almost all fibril fibers observed had a fiber diameter of 0.1 μm to 0.5 μm and a degree of curvature of 1.7. Then, non-fibrillated regenerated cellulose fiber having a fiber diameter of about 10 μm was cut to a fiber length of about 3 mm and dispersed in water to obtain a matrix material. The fibril fibers were added to this dispersion to obtain a dispersion of both the cellulose fiber and the fibril fibers. The total fiber concentration was 1.0 g/L and the content of the fibril fibers was adjusted to 10 wt % based on the total fiber weight.

Polypropylene mesh (#200) was cut into a sheet 30 cm square, and the bottom of a funnel-like paper-making apparatus was covered with the sheet, after which pure water was accumulated to a height of about 1 cm above the mesh surface. This dispersion was gently poured into the pure water and mildly stirred, after which water was discharged from the bottom of the paper-making apparatus. The web formed on the mesh was dried in vacuo at 40° C. for 16 hours. The thus produced leukocyte-removing filter medium had a basis weight of 20 g/m$^2$ and a bulk density of 0.15 g/cm$^3$.

A laminate of 8 sheets of the filter medium produced in the manner described above was packed into a cylindrical container with a diameter of 25 mm at a packing density of 0.20 g/cm$^3$. Ten milliliters of a concentrated red cell product (hematocrit 63%) preserved at 4–5° C. for 7 days after addition of the same MAP solution as an erythrocyte-preserving solution as in the Reference Example was allowed to stand at room temperature until its temperature reached 22–23° C., after which this preparation was filtered through the above-mentioned filter. The filtration was carried out at a constant flow rate of 3 mL/min. by using a pump. The pressure loss accompanying the filtration and the numbers of leukocytes before and after the filtration were measured, and the leukocyte residual rate was calculated. The measurement of the numbers of leukocytes before and after the filtration was carried out by the same methods as in the Reference Example.

The leukocyte residual rate was $10^{-3.0}$ and the pressure loss was 28 mmHg.

Comparative Example 1

A dispersion of both polyacrylonitrile fiber having a fiber diameter of 0.2 $\mu$m to 0.6 $\mu$m and a degree of curvature of 1.1, and the same regenerated cellulose fiber having a fiber diameter of about 10 $\mu$m and a fiber length of about 3 mm as in Example 1 was prepared. The total fiber concentration of the polyacrylonitrile fiber and the regenerated cellulose fiber in the dispersion was 1.0 g/L, and the content of the polyacrylonitrile fiber was adjusted to 10 wt % based on the total fiber weight. A leukocyte-removing filter medium having a basis weight of 20 g/m$^2$ and a bulk density of 0.16 g/cm$^3$ was produced by making the dispersion into paper.

A concentrated red cell product was filtered through this filter medium by the same method as in Example 1 to find that the leukocyte residual rate was $10^{-1.2}$ and the pressure loss 37 mmHg.

Comparative Example 2

The same dispersion of fibril fibers and regenerated cellulose fiber having a total fiber concentration of 1.0 g/L as in Example 1 was prepared. However, the content of the fibril fibers was adjusted to 60 wt % based on the total fiber weight. A leukocyte-removing filter medium having a basis weight of 20 g/m$^2$ and a bulk density of 0.17 g/cm$^3$ was produced by making the dispersion into paper.

When a concentrated red cell product was filtered through this filter medium by the same method as in Example 1, the pressure loss exceeded 300 mmHg and the blood stopped flowing in the course of the filtration.

Comparative Example 3

The same dispersion of fibril fibers and regenerated cellulose fiber having a total fiber concentration of 1.0 g/L as in Example 1 was prepared. However, the content of the fibril fibers was adjusted to 0.08 wt % based on the total fiber weight. A leukocyte-removing filter medium having a basis weight of 20 g/m$^2$ and a bulk density of 0.15 g/cm$^3$ was produced by making the dispersion into paper.

A concentrated red cell product was filtered through this filter medium by the same method as in Example 1 to find that the leukocyte residual rate was $10^{-0.9}$ and the pressure loss 17 mmHg.

EXAMPLE 2

The same dispersion of fibril fibers and regenerated cellulose fiber having a total fiber concentration of 1.0 g/L as in Example 1 was prepared. However, the content of the fibril fibers was adjusted to 20 wt % based on the total fiber weight. A leukocyte-removing filter medium having a basis weight of 20 g/m$^2$ and a bulk density of 0.16 g/cm$^3$ was produced by making the dispersion into paper.

A concentrated red cell product was filtered through this filter medium by the same method as in Example 1 to find that the leukocyte residual rate was $10^{-3.4}$ and the pressure loss 39 mmHg.

EXAMPLE 3

From a whole blood product prepared by adding 56 mL of a CPD solution as an anticoagulant to 400 mL of blood, platelet-rich plasma was removed by centrifugation within 8 hours after blood-collecting, and a MAP solution was added to the residue as an erythrocyte-preserving solution to prepare a concentrated red cell product, which was preserved at 4–5° C. for 10 days. The concentrated red cell product was filtered by the use of a filter apparatus obtained by packing non-woven fabrics having fiber diameters of 32 $\mu$m and 12 $\mu$m, respectively, produced by a spun bond method, into a container having an effective filtration sectional area of 45 cm$^2$, at a packing density of 0.28 g/cm, to remove very small aggregates in blood.

Three hundred milliliters of the concentrated red cell product freed of the very small aggregates was allowed to stand until its temperature reached room temperature of 22–25° C. A laminate of 16 sheets of a leukocyte-removing filter medium produced by the same process as in Example 1 was packed into a container having an effective filtration sectional area of 45 cm$^2$, at a packing density of 0.22 g/cm$^3$ to produce a filter apparatus. Using this filter apparatus, the concentrated red cell product freed of the very small aggregates was filtered at a fall of 1 m. For starting the filtration, the filter was connected to a blood bag containing the concentrated red cell product, through a blood line, after which the blood bag was pressed by grasping it with a hand, to forcibly fill the filter with the blood.

As a result of the above procedure, the leukocyte residual rate was $10^{-4.8}$ and the average treatment rate in the blood filtration was 22.3 g/min.

Comparative Example 4

A laminate of 16 sheets of a leukocyte-removing filter medium produced by the same process as in Comparative Example 2 was packed into a container having an effective filtration sectional area of 45 cm$^2$, at a packing density of 0.22 g/cm$^3$ to produce a filter apparatus. Using this apparatus, blood was filtered by the same method as in Example 3 to find that the leucocyte remaining rate was $10^{-2.3}$ and the average treatment rate 19.3 g/min.

EXAMPLE 4

Regenerated cellulose fiber having a fiber diameter of about 15.4 $\mu$m (Bemberg® NP-spinning fiber, manufactured by ASAHI Chemical Industry Co., Ltd.) was cut to a fiber length of about 5 mm. The resulting fiber pieces were immersed in an aqueous sodium hydroxide solution (8 wt %) at about 10° C. and stirred at 60 rpm for 60 minutes. After removing the sodium hydroxide by washing with water, the pieces of the regenerated fiber were dispersed in water to a concentration of 2.0 g/L and vigorously stirred with a mixer at 10,000 rpm for 60 minutes. Thus, a suspension of fibril fibers formed by fibrillation of the regenerated cellulose fiber was prepared. When the fibril fibers obtained were photographed by the use of a scanning electron microscope and observed, almost all the fibers had a fiber diameter of 0.1 $\mu$m to 0.5 $\mu$m and a curved shape. Then, poly(ethylene terephthalate) fiber having a fiber diameter of about 4 μm was cut to a fiber length of about 3 mm and dispersed in water. At the time of the dispersion, a commercially available surfactant (Tween® 20) was added to a concentration of 0.1 wt %. The fibril fibers were added to the resulting dispersion to obtain a dispersion of both the poly(ethylene terephthalate) fiber and the fibril fibers. The total fiber concentration was 0.25 g/L and the content of the fibril fibers was adjusted to 10 wt % based on the total fiber weight.

Using the above-mentioned dispersion, a leukocyte-removing filter medium was produced by the same process as in Example 1. The filter medium obtained had a basis weight of 40 g/m$^2$ and a bulk density of 0.17 g/cm$^3$. When the filter medium was photographed by the use of a scanning electron microscope and observed, a plurality of curved fibril fibers formed a curvilinear porous structure by their entanglement with one another. The roundness and the diameter in terms of circle were measured for 100 pores formed by the fibril fibers, to find that the roundness was 1.3 and the diameter in terms of circle 3.8 μm.

A laminate of 4 sheets of the filter medium produced in the manner described above was packed into a cylindrical container with a diameter of 25 mm at a packing density of 0.20 g/cm$^3$. Ten milliliters of a concentrated red cell product (hematocrit 63%) preserved at 4–5° C. for 7 days after addition of a MAP solution as erythrocyte-preserving solution was allowed to stand at room temperature until its temperature reached 22–23° C., after which this preparation was filtered by the same method as in Example 1. As a result, the leukocyte residual rate was $10^{-3.4}$ and the pressure loss was 27 mmHg.

Comparative Example 5

A dispersion was prepared by dispersing the same poly (ethylene terephthalate) fiber with a fiber diameter of about 4 μm and a fiber length of about 3 mm as in Example 4 into water containing a surfactant, so that the total fiber concentration might be 0.25 g/L. Using this dispersion, paper was made by the same method as in Example 4. However, the filter medium thus obtained was poor in mechanical strength, and hence was treated with a high-pressure liquid after the paper making. The high-pressure liquid treatment was carried out under the following conditions: nozzle diameter 0.2 mm, nozzle pitch 5 mm, number of revolution of nozzle header 150 rpm, and pressure 70 kg/cm$^2$. The leukocyte-removing filter medium had a basis weight of 40 g/m$^2$ and a bulk density of 0.14 g/cm$^3$.

A concentrated red cell product was filtered through this filter medium by the same method as in Example 1 to find that the leukocyte residual rate was $10^{-1.4}$ and the pressure loss 22 mmHg.

Comparative Example 6

A dispersion of both polyacrylonitrile fiber with a fiber diameter of 0.2 μm to 0.6 μm and the same poly(ethylene terephthalate) fiber with a fiber diameter of about 4 μm and a fiber length of about 3 mm as in Example 4 which contained a surfactant was prepared. The total fiber concentration of the polyacrylonitrile fiber and the poly(ethylene terephthalate) fiber in the dispersion was 0.25 g/L, and the content of the polyacrylonitrile fiber was adjusted to 10 wt % based on the total fiber weight. The dispersion was made into paper to produce a leukocyte-removing filter medium having a basis weight of 40 g/m$^2$ and a bulk density of 0.17 g/cm$^3$. When the leukocyte-removing filter medium was photographed by the use of a scanning electron microscope and observed, there were many portions where a plurality of linear ultra-fine fibers were intertwined with one another to form a bundle of the fibers or a single ultra-fine fiber adhered to the poly(ethylene terephthalate) fiber along the fiber axis of this fiber without intertwining with another ultra-fine fiber. A large number of photographs of the leukocyte-removing filter medium were taken, and the roundness and the diameter in terms of circle were measured for 100 pores formed by ultra-fine fibers, to find that the roundness was 1.9 and the diameter in terms of circle 3.5 μm.

A concentrated red cell product was filtered through the filter medium by the same method as in Example 1 to find that the leukocyte residual rate was $10^{-2.4}$ and the pressure loss 56 mmHg.

Comparative Example 7

There was prepared a dispersion of the same fibril fibers and poly(ethylene terephthalate) fiber as in Example 4 which had a total fiber concentration of 0.25 g/L and contained a surfactant. However, the content of the fibril fibers was adjusted to 60 wt % based on the total fiber weight. The dispersion was made into a paper to produce a leukocyte-removing filter medium having a basis weight of 40 g/m$^2$ and a bulk density of 0.19 g/cm$^3$. The roundness and diameter in terms of circle of pores formed by the ultra-fine fibers are measured by the same method as in Example 4 to find that the roundness was 1.3 and the diameter in terms of circle 0.7 μm.

When a concentrated red cell product was filtered through the filter medium by the same method as in Example 1, the pressure loss exceeded 300 mmHg and the blood stopped flowing in the course of the filtration.

Comparative Example 8

There was prepared a dispersion of the same fibril fibers and poly(ethylene terephthalate) fiber as in Example 4 which had a total fiber concentration of 0.25 g/L and contained a surfactant. However, the content of the fibril fibers was adjusted to 0.07 wt % based on the total fiber weight. The dispersion was made into a paper to produce a leukocyte-removing filter medium having a basis weight of 40 g/m$^2$ and a bulk density of 0.15 g/cm$^3$. The roundness and diameter in terms of circle of pores formed by the ultra-fine fibers are measured by the same method as in Example 4 to find that the roundness was 1.4 and the diameter in terms of circle 2.3 μm.

A concentrated red cell product was filtered through the filter medium by the same method as in Example 1 to find that the leukocyte residual rate was $10^{-1.9}$ and the pressure loss 23 mmHg.

EXAMPLE 5

A concentrated red cell product free from very small aggregates in blood was prepared by the same method as in Example 3, and 300 mL of the concentrated red cell product was allowed to stand until its temperature reached room temperature of 22 to 25° C. A laminate of 8 sheets of a leukocyte-removing filter medium produced by the same process as in Example 4 was packed into a container having an effective filtration sectional area of 45 cm$^2$, at a packing density of 0.22 g/cm$^3$ to produce a filter apparatus. Using this filter apparatus, the concentrated red cell product free from the very small aggregates was filtered by the same method as in Example 3. As a result of the above procedure, the leukocyte residual rate was $10^{-5.3}$ and the average treatment rate was 20.7 g/min.

EXAMPLE 6

Commercial cottony purified cellulose fiber having a fiber diameter of about 12 μm (TENCEL®, manufactured by Courtaulds Co., Ltd.) was cut to a fiber length of about 5 mm. The resulting fiber pieces were immersed in an aqueous sodium hydroxide solution (1 wt %) at about 50° C. and mildly stirred at 60 rpm for 60 minutes. After washing with water, the fiber pieces were treated by immersion in an aqueous sulfuric acid solution (3 wt %) at 70° C. for 30 minutes with mild stirring at 60 rpm. After re-washing with water, the pieces of the purified cellulose fiber were dispersed in water to a concentration of 2.0 g/L and vigorously stirred with a mixer at 10,000 rpm for 30 minutes. The resulting dispersion was filtered through polypropylene mesh (#50). By the above treatment, there was prepared a suspension of fibril fibers formed by fibrillation of the purified cellulose. When the fibril fibers obtained were photographed by the use of a scanning electron microscope and observed, almost all the fibril fibers had a fiber diameter of 0.1 μm to 0.4 μm and the average fiber diameter was 0.21 μm. The degree of curvature was 1.6.

Then, poly(ethylene terephthalate) fiber having an average fiber diameter of about 3 μm was cut to a fiber length of about 3 mm and dispersed in water. At the time of the dispersion, a commercially available surfactant (Tween® 20) was added to a concentration of 0.1 wt %. The fibril fibers were added to the resulting dispersion to obtain a dispersion of both the poly-(ethylene terephthalate) fiber and the fibril fibers. The total fiber concentration was 0.25 g/L and the content of the fibril fibers was adjusted to 7 wt % based on the total fiber weight.

Using this fiber dispersion, a leukocyte-removing filter medium was produced by the same process as in Example 1. The filter medium obtained had a basis weight of about 40 g/m². The filter medium obtained had a porous structure formed by the fibril fibers and having pores having a roundness of 1.27 and a diameter in terms of circle of 4.6 μm. The void content of the filter medium was 86%, and the ratio between the average fiber diameters of short fibers and ultra-fine fibers of the filter medium was 14.3.

A laminate of 5 sheets of the filter medium produced was packed into a container having an effective filtration sectional area of 36.0 cm² (6.0 cm×6.0 cm), at a packing density of 0.22 g/cm³ to produce a filter apparatus having a filter apparatus capacity of 5 mL. Using a line having an incorporated filter apparatus having an inlet and an outlet, a concentrated red cell product (100 mL) freed of very small aggregates was allowed to stand until its temperature reached room temperature of 22–25° C. was filtered by introducing the preparation through the inlet to pass through the filter apparatus, and then the filtrate was discharged through the outlet to recover the same. The filtration was carried out at a fall of 1.0 m. As a result, the leukocyte residual rate was $10^{-4.7}$ and the average treatment rate 17.6 g/min.

EXAMPLE 7

Regenerated cellulose fiber having a fiber diameter of about 15 μm (Bemberg® NP-spinning fiber, manufactured by ASAHI Chemical Industry Co., Ltd.) was cut to a fiber length of about 5 mm. The resulting fiber pieces were immersed in an aqueous sodium hydroxide solution (1 wt %) at about 5° C. and mildly stirred at 60 rpm for 60 minutes. After washing with water, the fiber pieces were treated by immersion in an aqueous sulfuric acid solution (3 wt %) at 70° C. for 30 minutes with mild stirring at 60 rpm. After re-washing with water, the pieces of the regenerated cellulose fiber were dispersed in water to a concentration of 2.0 g/L and vigorously stirred with a mixer at 10,000 rpm for 5 minutes. Thus, the regenerated cellulose fiber was made into fiber having a branched structure consisting of a trunk-like fiber and branch-like fibril fibers branched from the trunk-like fiber, and a dispersion containing this fiber having the branched structure was prepared. When the fibril fibers of the obtained fiber having the branched structure, and fibril fibers separated from the trunk-like fiber were photographed by the use of a scanning electron microscope and observed, almost all the fibril fibers had a fiber diameter of 0.2 μm to 0.7 μm and the average fiber diameter was 0.5 μm. The degree of curvature was 1.47.

In the fiber dispersion prepared, the total fiber concentration was 0.5 g/L and the content of ultra-fine fibers present in the dispersion, inclusive of the branch-like fibril fibers, was 13 wt %.

The fiber dispersion was made into paper to produce a filter medium having a basis weight of about 40 g/m². The filter medium obtained had a porous structure formed by the fibril fibers and having pores having a roundness of 1.42 and a diameter in terms of circle of 4.8 μm. The void content of the filter medium was 83%, and the ratio between the average fiber diameters of trunk-like fiber and ultra-fine fibers of the filter medium was 30.

A concentrated red cell product was filtered by employing the same filter apparatus and method as in Example 6, except for using the above-mentioned filter medium, to find that the leukocyte residual rate was $10^{-4.0}$ and the average treatment rate 17.3 g/min.

EXAMPLE 8

A laminate of 10 sheets of a leukocyte-removing filter medium produced in the same manner as in Example 6 was packed into a container having an effective filtration sectional area of 45 cm² (6.7 cm×6.7 cm). On the filter medium were placed 4 sheets of poly(ethylene terephthalate) non-woven fabric having an average fiber diameter of about 33 μm and a basis weight of 50 g/m² and 6 sheets of poly (ethylene terephthalate) non-woven fabric having an average fiber diameter of about 12 μm and a basis weight of 30 g/m². Thus, a filter apparatus was produced which contained non-woven fabric having an average fiber diameter of about 33 μm, the non-woven fabric having an average fiber diameter of about 12 μm, and the leukocyte-removing filter medium which had been placed one upon another in this order from the upstream side of blood. The packing density of the leukocyte-removing filter medium was 0.22 g/cm³, and the capacity of the filter apparatus was 25 mL.

Six hundred milliliters (2 units) of a concentrated red cell product (hematocrit 57%) preserved at 4–5° C. for 7 days was allowed to stand until its temperature reached room temperature of 22–25° C., after which it was filtered by using a line incorporating the above-mentioned filter apparatus. The filtration was carried out while adjusting the treatment rate to about 8 g/min. by using a roller clamp.

The numbers of leukocytes before and after the filtration were measured and the leukocyte residual rate was calculated. Although the number of leukocytes before the filtration was measured by the same method as in Reference Example, the number of leukocytes after the filtration was measured by the following method having a very high sensitivity. An EBSS solution containing 5% Ficoll 400DL (this solution is hereinafter referred to as Ficoll solution) was placed in a bag containing the filtered blood (the recovered fluid), in the same volume as that of the recovered fluid while mixing them by shaking, and the recovery bag was fixed on a plasma separation stand and allowed to stand for 40 minutes. After the standing, the supernatant was gently recovered without agitating the precipitated erythrocyte layer, and then Ficoll solution was added again to the supernatant and the above procedure was repeated. The combined supernatant recovered by two runs of the procedure was dispensed into Corning 25350 centrifuge tubes and centrifuged at 840×g for 15 minutes, and the supernatant was discarded with an aspirator while taking care not to suck up the precipitate. In each centrifuge tube, 200 mL of a hemolyzing solution (a 1.145% solution of ammonium oxalate in physiological saline) was placed, followed by mixing with shaking, and the supernatant was discarded with an aspirator by the same method as above. The precipitate was collected in a 15-mL centrifuge tube and the hemolyzing solution was added thereto to make a total volume of 15 mL, after which the resulting mixture was allowed to stand at room temperature for 10 minutes and centrifuged at 468×g for 10 minutes, and the supernatant was discarded, leaving 0.5 mL of a liquid containing the precipitate. The liquid containing the precipitate was thoroughly stirred to obtain a suspension of single cells, after which 50 µL of a fluorescent staining solution (69.9 mg/L Acridine Orange solution) was added to the suspension and further stirred. The recovery of leukocytes by a series of the operations described above was taken as 55%, and the suspension containing the fluorescent staining solution was poured into a Nageotte hemocytometer, after which leukocytes were counted under an optical microscope, whereby the number of leukocytes after the filtration was determined.

The leukocyte residual rate was $10^{-6.7}$ and the number of remaining leukocytes was $8.6 \times 10^2$.

EXAMPLE 9

Both fibril fibers prepared by the same method as in Example 6 and glass fiber having an average fiber diameter of about 1.5 µm and a fiber length of about 2 mm were dispersed in water. The total fiber concentration was about 0.25 g/L, and the content of the fibril fibers was adjusted to 8 wt % based on the total fiber weight.

Using the resulting fiber dispersion, a leukocyte-removing filter medium was produced by the same process as in Example 1. The obtained filter medium had a basis weight of about 40 g/m². The obtained filter medium contained the fibril fibers mixed in the whole filter medium, and had a porous structure formed by the fibril fibers. The pores formed by the fibril fibers had a roundness of 1.21 and a diameter in terms of circle of 3.7 µm. The void content of the filter medium was 84%, and the ratio between the average fiber diameters of short fibers and ultra-fine fibers of the filter medium was 6.5.

A laminate of 10 sheets of the leukocyte-removing filter medium was packed into a container having an effective filtration sectional area of 45 cm² (6.7 cm×6.7 cm). On the filter medium were placed 4 sheets of poly(ethylene terephthalate) non-woven fabric having an average fiber diameter of about 33 µm and a basis weight of 50 g/m² and 6 sheets of poly(ethylene terephthalate) non-woven fabric having an average fiber diameter of about 12 µm and a basis weight of 30 g/m². Thus, a filter apparatus was produced which contained the non-woven fabric having an average fiber diameter of about 33 µm, the non-woven fabric having an average fiber diameter of about 12 µm, and the leukocyte-removing filter medium which had been placed one upon another in this order from the upstream side of blood. The packing density of the leukocyte-removing filter medium was 0.23 g/cm³, and the capacity of the filter apparatus was 25 mL.

Then, a 0.2% ethanolic solution of a copolymer of HEMA and DM (the DM content of the copolymer was 3 mol %) was poured into the apparatus at a flow rate of 80 g/min. while maintaining the solution at 40° C., and was circulated for 1.5 minutes, after which nitrogen was introduced into the apparatus at a flow rate of 1.5 L/min. to remove the excess coating solution. The non-woven fabrics and the filter medium were dried in vacuo at 60° C. for another 16 hours to produce a leukocyte-removing filter apparatus.

Using this filter apparatus, a concentrated red cell product (hematocrit 56%) was filtered by the same method as in Example 8. The leukocyte residual rate was $10^{-7.1}$ and the number of remaining leukocytes was $6.4 \times 10^2$.

EXAMPLE 10

Lyocell yarn (manufactured by Courtaulds Co., Ltd.) having a monofilament fiber diameter of about 12 µm was cut to a length of about 3 mm, and 1 g of the resulting pieces of the Lyocell yarn were dispersed in 1 L of water, after which the Lyocell yarn was sufficiently divided and fibrillated while mechanically vibrating the dispersion. The degree of swelling of fiber length with water of the resulting fibril fibers was measured on a micrograph and found to be 0.03%. Values of the fiber diameter were distributed between 0.03 µm and 0.8 µm.

A mixed dispersion of two kinds of fibers was prepared by dispersing the cellulose microfibrils and polyester short fibers having an average fiber diameter of about 1.2 µm in water so that the proportion of the cellulose microfibrils to the polyester short fibers might be 0.1 g of the former to 0.9 g of the latter.

Then, the mixed dispersion was made into paper on mesh and dried in vacuo at 40° C. for 16 hours to obtain a leukocyte-removing filter medium. The leukocyte-removing filter medium obtained had a thickness of 0.2 mm, an average pore size of 6.0 µm as measured by a bubble point method (Coulter® Porometer, mfd. by Coulter Electronics Inc.), a void content of 81%, and a content of the fibril fibers of 10 wt % based on the weight of the whole filter medium. As a result of observation of the filter medium by an electron microscope, it was confirmed that the fibril fibers had formed a porous structure. The void content and the fibril fiber content were measured by the same methods as in Reference Example.

A leukocyte-removing filter apparatus was produced by packing a laminate of 10 sheets of the filter medium produced in the manner described above into the same container as in the Reference Example. The total volume of the filter medium was 1.8 cm³. Then, 50 g of a concentrated red cell product (hematocrit 59%, number of leukocytes 6,400/µL) containing a MAP solution was filtered by the use of the aforesaid leukocyte-removing filter apparatus by the same method as in Reference Example. The leukocyte residual rate was $10^{-3.45}$. First 2 mL of the filtrate obtained by the blood filtration using the leukocyte-removing filter apparatus was collected, and the level of free hemoglobin in plasma was measured and found to be not different from that before the filtration.

On the other hand, regenerated cellulose fiber having a fiber diameter of about 20 µm (Bemberg® 250d/60f, manufactured by ASAHI Chemical Industry Co., Ltd.) was fibrillated by the same method as above. The degree of swelling of fiber length with water of the resulting fibril fibers was measured and found to be 2.7%. Values of the fiber diameter were distributed between 0.1 μm and 0.8 μm.

A filter medium was produced from the fibril fibers and polyester short fibers having an average fiber diameter of about 1.2 μm by the same process as above. Physical properties of the filter medium obtained were measured by the same methods as above. As a result, it was found that the filter medium had a thickness of 0.2 mm, an average pore size of 6.4 μm, a void content of 82%, and a content of the fibril fibers of 9 wt % based on the weight of the whole filter medium.

The same filter apparatus as above was produced by packing a laminate of 10 sheets of the filter medium produced in the manner described above, and 50 g of a concentrated red cell product was filtered by the use of this apparatus by the same method as above. As a result, the leukocyte residual rate was $10^{-2.89}$. The level of free hemoglobins in plasma obtained from first 2 mL of the filtrate obtained by the blood filtration was measured and found to be about 1.3 times that in blood before the filtration. That is, hemolysis was observed.

EXAMPLE 11

Lyocell yarn (manufactured by Courtaulds Co., Ltd.) having a monofilament fiber diameter of about 12 μm was used as cellulose fiber having a fibril index of 10 or more. When the fibril index of this cellulose fiber was measured at 10 points, all the measured values were more than 10, namely, they were 36, 19, 21, 50, 14, 13, 18, 28, 17 and 27. The cellulose fiber was cut to a fiber length of about 3 mm and fibrillated by the same method as in Reference Example to prepare ultra-fine fibril fibers.

A matrix material obtained by subjecting polyester non-woven fabric with an average fiber diameter of 1.0 μm, produced by a melt blow method, to the same coating treatment as in the Reference Example by using a copolymer of HEMA and DM (the DM content in the copolymer was 3 mol %) was used. The polyester non-woven fabric had an average pore size of 8.5 μm, a thickness of 0.19 mm, a bulk density of 0.22 g/cm$^3$, and a basis weight of 42 g/m$^2$. The average pore size was measured by the same method as in the Reference Example.

By the same process as in the Reference Example, a filter medium was produced by supporting fibril fibers on each side of the non-woven fabric coated above. The average fiber diameter of the fibril fibers supported on the non-woven fabric was 0.23 μm. The average fiber diameter was measured by the same method as in Reference Example. Thus, the ratio of the average pore size of the non-woven fabric used as a matrix to the average fiber diameter of the fiber structure was 37.0, and the ratio of the average fiber diameter of the non-woven fabric used as a matrix to the average fiber diameter of the fiber structure was 4.3.

The void content of the filter medium was 84% and the content of the fibril fibers was 1.0 wt % based on the weight of the filter medium. The void content and the content of the fibril fibers were also measured by the same methods as in Reference Example.

A leukocyte-removing filter apparatus was produced by packing a laminate of 7 sheets of the filter medium produced in the manner described above into a container having an effective filtration sectional area of 9.0 cm$^2$ (3.0 cm×3.0 cm). The total volume of the filter medium was 1.20 cm$^3$.

Using the aforesaid leukocyte-removing filter apparatus, 50 g of an red cell concentrate (RC-MAP: hematocrit value 61%, number of leukocytes 4,120/μL) preserved at 4° C. for 7 days was filtered by the same method as in Reference Example.

As a result, the average treatment rate in the filtration of the red cell concentrate was 12.3 g/min. and the leukocyte residual rate was $10^{-3.15}$. The levels of free hemoglobin before and after the filtration were compared and found not to be different at all.

On the other hand, the fibril index of regenerated cellulose fiber having a fiber diameter of about 8 μm (Bemberg®, 60d/90f, manufactured by ASAHI Chemical Industry Co., Ltd.) was measured at 10 points by the same method as above, all the measured values were less than 10, namely, they were 3, 5, 1, 5, 6, 4, 3, 1, 2 and 3. The regenerated cellulose fiber was fibrillated by the same procedure as above to find that the average fiber diameter of the resulting fibril fibers was 0.31 μm.

A filter medium was produced by making a dispersion of the fibril fibers into paper on each side of the same non-woven fabric used as a matrix as above, by the same method as above. The ratio of the average pore size of the non-woven fabric used as a matrix to the average fiber diameter of the fiber structure is 27.4, and the ratio of the average fiber diameter of the non-woven fabric used as a matrix to the average fiber diameter of the fiber structure is 3.2. The void content of the filter medium was 82% and the content of the fibril fibers was 1.1 wt % based on the weight of the filter medium.

A leukocyte-removing filter apparatus was produced by packing a laminate of 7 sheets of the filter medium produced in the manner described above into a container having an effective filtration sectional area of 9.0 cm$^2$ (3.0 cm×3.0 cm). The total volume of the filter medium was 1.22 cm$^3$.

Using the leukocyte-removing filter apparatus, 50 g of an red cell concentrate (RC-MAP: hematocrit value 61%, number of leukocytes 4,120/μL) preserved at 4° C. for 7 days was filtered.

As a result, the average treatment rate in the filtration of the red cell concentrate was 11.3 g/min. and the leukocyte residual rate was $10^{-2.69}$ g/min. The levels of free hemoglobin before and after the filtration were compared and found to be the same.

EXAMPLE 12

Non-woven fabric of splittable cellulose containing cellulose microfibril fibers having a fiber diameter of less than 1.0 μm and not less than 0.01 μm was prepared by the following procedure.

Lyocell yarn (manufactured by Courtaulds Co., Ltd.) having a monofilament fiber diameter of about 12 μm was used as splittable cellulose fiber. The splittable cellulose fiber was immersed in a 1 wt % aqueous sodium hydroxide solution and subjected to alkali treatment therein at 0° C. to 5° C. for 60 minutes. After washing with water, the splittable cellulose fiber was immersed in a 3 wt % aqueous sulfuric acid solution and subjected to acid treatment therein at 70° C. for 30 minutes. After washing with water, the splittable cellulose fiber was split and then spread on a net in the form of a mat. Subsequently, the mat obtained was treated with a high-pressure liquid. In detail, a pillar-shaped jet was directed to the mat from a distance of 30 cm for 10 seconds on each side, i.e., 20 seconds in total under the following conditions: nozzle diameter 0.2 mm, nozzle pitch 5 mm, and pressure 30 kg/cm$^2$.

The resulting non-woven fabric was dried and its physical properties were investigated. The thickness was 0.2 mm, the void content was 82%, the percentage of the total area of cellulose microfibrils having a fiber diameter of less than 1.0 µm and not less than 0.01 µm was 28% based on the area of the whole cellulose when observed by a scanning electron microscope, and the fiber diameter values of cellulose fibers having a fiber diameter of 1.0 µm or more were distributed between 1.0 µm and 13 µm. The fibril fibers having a fiber diameter of less than 1.0 µm and not less than 0.01 µm formed a porous structure having nearly round pores, and were entangled sufficiently with the cellulose fibers having a fiber diameter of 1.0 µm.

The non-woven fabric obtained was subjected to the following experiment as the leukocyte-removing filter medium of the present invention. A leukocyte-removing filter apparatus was produced by packing a laminate of 8 sheets of the filter medium produced in the manner described above into a container having an effective filtration sectional area of 9.0 cm$^2$ (3.0 cm×3.0 cm). The total volume of the filter medium was 1.44 cm$^3$.

Using the leukocyte-removing filter apparatus, 50 g of a concentrated red cell product (RC-MAP: hematocrit value 58%, number of leukocytes 5,200/µL) preserved at 4° C. for 7 days was filtered by the same method as Reference Example.

As a result, the average treatment rate in the filtration of the red cell concentrate was 10.8 g/min. and the leukocyte residual rate was $10^{-3.11}$. The levels of free hemoglobin before and after the filtration were compared and found to not be different.

EXAMPLE 13

As splittable fiber, cuprammonium rayon yarn having a fiber diameter of about 10 µm (Bemberg® continuous-spinning yarn 40d/45f, manufactured by ASAHI Chemical Industry Co., Ltd.) was cut to a fiber length of about 3.0 mm. The resulting pieces were immersed in a 1 wt % aqueous sodium hydroxide solution and subjected to alkali treatment therein at 0° C. to 5° C. for 60 minutes with mild stirring at 60 rpm. After washing with water, the pieces were immersed in a 3 wt % aqueous sulfuric acid solution and subjected to acid treatment therein at 70° C. for 30 minutes with mild stirring at 60 rpm. The sulfuric acid was washed away with pure water to prepare splittable fiber.

As a matrix material, poly(ethylene terephathalate) short fibers with a fiber diameter of 3.9 µm obtained by cutting to a fiber length of 5.0 mm were used.

The splittable fiber and the matrix material were added to a 0.1 wt % aqueous Tween® solution so that their concentration in a prepared dispersion was 0.1 wt %, and the resulting mixture was vigorously stirred with a mixer at 10,000 rpm for 2 seconds to prepare the fiber dispersion. The mixing ratio of the splittable fiber to the matrix material was as follows: splittable fiber: matrix material=1:9 by weight. Polypropylene mesh (#200) was cut into a sheet 30 cm square, and the bottom of a funnel-like paper-making apparatus was covered with the sheet, after which pure water was accumulated to a height of about 1 cm above the mesh surface. 3.6 Liters of the fiber dispersion was gently poured into the pure water and mildly stirred, after which water was discharged from the bottom of the paper-making apparatus, whereby a fiber composite of the splittable fiber and the matrix material was formed on the mesh.

Subsequently, the fiber composite obtained was treated with a high-pressure liquid. In detail, each side of the fiber composite was treated with a pillar-shaped jet (100 kg/cm$^2$) for 5 minutes under the following conditions: nozzle diameter 0.2 mm, nozzle pitch 5 mm, number of rows of nozzles 18, distance between nozzle tip and the fiber composite 30 mm, number of revolution of nozzle header 150 rpm, and rate of movement of the filter medium 5 m/min. After the high-pressure liquid treatment, the fiber composite was dried in vacuo at 40° C. for 16 hours to produce a leukocyte-removing filter medium.

The leukocyte-removing filter medium thus obtained had a thickness of 0.2 mm, a bulk density of 0.2 g/cm$^3$ and a basis weight of 40 g/m$^2$. The average fiber diameter of ultra-fine fibers obtained by splitting of the splittable fiber was 0.39 µm. The void content of the leukocyte-removing filter medium was 85%, and the content of the ultra-fine fibers obtained by splitting of the splittable fiber was 7.1 wt % based on the weight of the leukocyte-removing filter medium. The measurement of the average fiber diameter of the ultra-fine fibers, the measurement of the void content of the filter medium, and the measurement of the content of the ultra-fine fibers were carried out by the same methods as in Reference Example.

A leukocyte-removing filter apparatus was produced by packing a laminate of 8 sheets of the leukocyte-removing filter medium produced in the manner described above into a container having an effective filtration sectional area of 9.0 cm$^2$ (3.0 cm×3.0 cm), at a packing density of 0.22 g/cm$^3$. The total volume of the leukocyte-removing filter medium was 1.36 cm$^3$. A 0.2% ethanolic solution of a copolymer of HEMA and DM (the DM content of the copolymer was 3 mol %) was poured into the apparatus at a flow rate of 80 g/min. while maintaining the solution at 40° C., and was circulated for 1.5 minutes, after which nitrogen was introduced into the apparatus at a flow rate of 1.5 L/min. to remove the excess coating solution. The filter medium was dried in vacuo at 40° C. for another 16 hours to produce a leukocyte-removing filter apparatus.

Using the leukocyte-removing filter apparatus, 50 g of an red cell concentrate (RC-MAP: hematocrit value 64%, number of leukocytes 6,330/µL) preserved at 4° C. for 8 days was filtered by the same method as Reference Example.

As a result, the average treatment rate in the filtration of the red cell concentrate was 11.4 g/min. and the leukocyte residual rate was $10^{-3.02}$.

Comparative Example 9

A fiber composite prepared by the same procedure as in Example 13 was dried in vacuo at 40° C. for 16 hours without high-pressure liquid treatment to produce a leukocyte-removing filter medium. The leukocyte-removing filter medium obtained had a thickness of 0.22 mm, a bulk density of 0.18 g/cm$^3$, a basis weight of 40 g/m$^2$ and a void content of 88%.

A leukocyte-removing filter apparatus was produced by packing a laminate of 8 sheets of the leukocyte-removing filter medium into a container having an effective filtration sectional area of 9.0 cm$^2$ (3.0 cm×3.0 cm), at a packing density of 0.21 g/cm$^3$. The total volume of the leukocyte-removing filter medium was 1.45 cm$^3$. This apparatus was subjected to the same coating treatment as in Example 13 to produce a leukocyte-removing filter apparatus. Using this leukocyte-removing filter apparatus, 50 g of the same red cell concentrate as in Example 13 was filtered by the same procedure as in Example 13. The temperature of the red cell concentrate immediately before starting the filtration was 10° C. As a result, the average treatment rate was 21.5 g/min. and the leukocyte residual rate was $10^{-0.99}$ g/min.

What is claimed is:

1. A leukocyte-removing filter medium which comprises a matrix and ultra-fine fibers having a fiber diameter of less than 1.0 μm and not less than 0.01 μm and contains said ultra-fine fibers in an amount of less than 50 wt % and not less than 0.1 wt %, the degree of curvature of said ultra-fine fibers being 1.2 or more, and/or said ultra-fine fibers forming pores having a roundness of 1.7 or less.

2. A leukocyte-removing filter medium according to claim 1, wherein the diameter in terms of a circle of the pores formed by the ultra-fine fibers is less than 20 μm and not less than 1 μm.

3. A leukocyte-removing filter medium according to claim 1, wherein the matrix is a fiber assembly composed of short fibers having a fiber diameter of less than 30 μm and not less than 1 μm and a fiber length of less than 10 mm and not less than 0.1 mm as a matrix material.

4. A leukocyte-removing filter medium according to claim 1, comprising fiber having a branched structure formed by uniting a matrix material composed of short fibers and ultra-fine fibers into a body.

5. A leukocyte-removing filter medium according to claim 1, wherein the matrix is a porous membrane or a spongy structure, which has an average pore size of less than 100 μm and not less than 1 μm.

6. A leukocyte-removing filter medium according to claim 1, wherein the matrix is a particle assembly composed of particles having an average particle diameter of less than 300 μm and not less than 1 μm as a matrix material.

7. A leukocyte-removing filter apparatus for removing leukocytes from a leukocyte-containing fluid, said filter apparatus comprising 1) an inlet, 2) a filter comprising at least one sheet of the filter medium according to claim 1 and 3), an outlet.

8. A method for removing leukocytes from a leukocyte-containing fluid which comprises using an apparatus comprising 1) an inlet, 2) a filter comprising at least one sheet of the filter medium according to claim 1 and 3) an outlet, introducing the leukocyte-containing fluid through the inlet, and recovering the filtrate obtained by filtration through said filter, through the outlet.

9. A process for producing a leukocyte-removing filter medium which comprises previously mixing a matrix material with ultra-fine fibers having a fiber diameter of less than 1.0 μm and not less than 0.01 μm, and then producing a filter medium, said filter medium containing said ultra-fine fibers in an amount of less than 50 wt % and not less than 0.1 wt %, the degree of curvature of said ultra-fine fibers being 1.2 or more, and/or said ultra-fine fibers forming pores having a roundness of 1.7 or less.

10. A production process according to claim 9, wherein the matrix material is short fibers having a fiber diameter of less than 30 μm and not less than 1.0 μm and a fiber length of less than 10 mm and not less than 0.1 mm, and said matrix material and said ultra-fine fibers are previously mixed and dispersed in a dispersion medium and then made into paper.

11. A production process according to claim 9, wherein the main constituent of said filter medium is fiber having a branched structure obtained by uniting a matrix material composed of short fibers with ultra-fine fibers in a body.

12. A production process according to claim 9, wherein the matrix material is particles having an average particle diameter of less than 300 μm and not less than 1.0 μm, and said matrix material and said ultra-fine fibers are previously dispersed in a dispersion medium and then made into paper.

13. A production process according to claim 9, wherein the matrix material is a polymer solution capable of forming a porous membrane or a spongy structure, and the filter medium is produced after dispersing said ultra-fine fibers in said polymer solution.

* * * * *